US008964311B2

(12) United States Patent
Baba

(10) Patent No.: US 8,964,311 B2
(45) Date of Patent: Feb. 24, 2015

(54) OPTICAL UNIT AND IMAGING APPARATUS

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 13/805,609

(22) PCT Filed: Jul. 13, 2011

(86) PCT No.: PCT/JP2011/065957
§ 371 (c)(1),
(2), (4) Date: Dec. 19, 2012

(87) PCT Pub. No.: WO2012/011416
PCT Pub. Date: Jan. 26, 2012

(65) Prior Publication Data
US 2013/0094102 A1    Apr. 18, 2013

(30) Foreign Application Priority Data
Jul. 20, 2010  (JP) .................... 2010-163049

(51) Int. Cl.
G02B 9/12     (2006.01)
G02B 13/00    (2006.01)

(52) U.S. Cl.
CPC ............ *G02B 13/006* (2013.01); *G02B 13/003* (2013.01); *G02B 13/0035* (2013.01); *G02B 13/0085* (2013.01); *G02B 13/001* (2013.01)
USPC ........................................................ 359/784

(58) Field of Classification Search
CPC ................................................ G02B 13/0035
USPC ........................................................ 359/784
See application file for complete search history.

(56) References Cited

U.S. PATENT DOCUMENTS 7,564,496 B2 *   7/2009   Wolterink et al. ............ 348/340
2006/0044450 A1  3/2006   Wolterink et al.

FOREIGN PATENT DOCUMENTS

JP    09-311272     12/1997
JP    10-307257     11/1998
JP    2000-035538    2/2000

(Continued)

OTHER PUBLICATIONS

International Search Report; International Application No. PCT/JP2011/065957; International Filing Date: Jul. 13, 2011. Form PCT/ISA/210.

(Continued)

*Primary Examiner* — James Jones
(74) *Attorney, Agent, or Firm* — Rader, Fishman & Grauer PLLC

(57) ABSTRACT

The present invention provides an optical unit and an imaging device, which are capable of providing a small-sized low-cost imaging optical system that has high resolution and high heat resistance. The optical unit comprises at least a first lens group (110) and a second lens group (120) among the first lens group, the second lens group and a third lens group which are sequentially arranged from the object side to the image plane side. The first lens group (110) comprises an assembly of at least a first lens element (111) and a second lens element (112), a transparent body (113) and a third lens element (114) which are sequentially arranged from the object side to the image plane side. The first lens element (111) and the second lens element (112) of the assembly are formed from resin materials that have different temperature-dependent refractive index changes.

17 Claims, 11 Drawing Sheets

(56) References Cited

FOREIGN PATENT DOCUMENTS

| | | |
|---|---|---|
| JP | 2000-275526 A | 10/2000 |
| JP | 2005-128194 A | 5/2005 |
| JP | 2005-517984 A | 6/2005 |
| JP | 2006-284620 A | 10/2006 |
| JP | 2006-323365 A | 11/2006 |
| JP | 3976781 B1 | 9/2007 |
| JP | 2008-287006 | 11/2008 |
| JP | 2009-070423 A | 4/2009 |

OTHER PUBLICATIONS

Written Opinion of the International Searching Authority; International Application No. PCT/JP2011/065957; International Filing Date: Jul. 13, 2011. Form PCT/ISA/220 and PCT/ISA/237.

* cited by examiner

OPTICAL UNIT AND IMAGING APPARATUS

TECHNICAL FIELD

The present invention relates to an optical unit applied to an imaging device and an imaging apparatus.

BACKGROUND ART

In recent years, there is a strong demand for high resolution, low cost, and miniaturization for an imaging device mounted in a mobile phone, a personal computer (PC), and the like.

As the cell pitch in an imaging element, such as a CCD (Charge Coupled Device) or a CMOS (Complementary Metal Oxide Semiconductor) image sensor, is significantly decreased, high imaging performance capable of suppressing optical aberrations, especially axial chromatic aberration, is requested for an optical system compared with a normal optical system.

In addition, in response to price requests, a technique of manufacturing a large number of lenses at the same time in the form of a wafer in order to reduce the cost is known.

As a typical example, a technique disclosed in PTL 1 is known.

The technique disclosed in PTL 1 is called a hybrid method.

In the hybrid method, a number of lenses are formed on the wafer-shaped glass substrate, and the imaging element wafer and the lens elements are bonded in a wafer state. Then, these are separated into pieces to manufacture a large number of camera modules at the same time.

The hybrid method is advantageous in that an IR cut filter or a diaphragm can be formed on a glass wafer and accordingly these separate components are not necessary unlike the related art, and a large number of finished products can be manufactured at the same time, and accordingly the number of assembly steps per product is reduced and products can be manufactured inexpensively.

In the former case, since no separate IR cut filter is necessary, there is also an advantage in that the back focus of the lens can be short. Therefore, a more flexible optical design is possible.

As a specific example of the optical design used in these techniques, that disclosed in PTL 2 is known.

In this technique, a 2-group configuration is adopted to meet high imaging performance and the short optical length.

In addition, in order to further improve the characteristics, it is possible to adopt a doublet structure in which lens resins overlap each other.

As such an example, the technique disclosed in PTL 3 is known. PTL 3 discloses realizing a high NA by disposing replica lenses in one place so as to overlap each other.

CITATION LIST

Patent Literature

[PTL 1] US 2006/0044450A1
[PTL 2] Japanese Patent No. 3976781
[PTL 3] JP-T-2005-517984

SUMMARY OF INVENTION

Technical Problem

PTL 3 discloses only the convex-convex configuration. This configuration is useful in the case of an objective lens or a collimator lens.

In the case of the convex-convex configuration, however, an imaging optical system that is a predetermined application is not useful since it is difficult to correct aberrations.

In addition, only an example is mentioned in which lenses are formed on one surface of one glass substrate, and there is no specific design example.

In addition, UV curable lens resin or thermosetting lens resin used in these designs has a large temperature-refractive index change characteristic. For this reason, it is known that a problem of defocusing of the lens element itself due to temperature occurs.

In particular, when the UV curable resin material or the thermosetting resin material is used as a lens material in a camera having 3 megapixels or higher, the focus change due to temperature becomes a problem in practical use. Accordingly, it is necessary to solve this problem.

It is an object of the present invention to provide an optical unit and an imaging apparatus capable of realizing an imaging optical system that is small and inexpensive and also has high heat resistance and high resolution.

Solution to Problem

In optical unit according to a first aspect of the present invention includes at least first and second lens groups of the first and second lens groups and a third lens group disposed in order from an object side toward an image surface side. The first lens group includes a bonding body of at least two first and second lens elements, a transparent body, and a third lens element that are disposed in order from the object side toward the image surface side. In the bonding body, the first and second lens elements are formed of resin materials having different temperature refractive index changes.

An optical unit according to a second aspect of the present invention includes at least one lens element with positive power and at least one lens element with negative power that are disposed in order from an object side toward an image surface side, are formed of at least two or more resin materials having different temperature refractive index changes, and overlap each other on a curved surface. The temperature refractive index change ($|dn/dt|$) of the lens element with positive power is smaller than the temperature refractive index change ($|dn/dt|$) of the lens element with negative power by at least $0.1 \times 10^{-4}$ [1/deg].

An imaging apparatus according to a third aspect of the present invention includes an imaging device and an optical unit that forms a subject image on the imaging device. The optical unit includes at least first and second lens groups of the first and second lens groups and a third lens group disposed in order from an object side toward an image surface side. The first lens group includes a bonding body of at least two first and second lens elements, a transparent body, and a third lens element that are disposed in order from the object side toward the image surface side. In the bonding body, the first and second lens elements are formed of resin materials having different temperature refractive index changes.

An imaging apparatus according to a fourth aspect of the present invention includes an imaging device and an optical unit that forms a subject image on the imaging device. The optical unit includes at least one lens element with positive power and at least one lens element with negative power that are disposed in order from an object side toward an image surface side, are formed of at least two or more resin materials having different temperature refractive index changes, and overlap each other on a curved surface. The temperature refractive index change ($|dn/dt|$) of the lens element with positive power is smaller than the temperature refractive index change (|dn/dt|) of the lens element with negative power by at least $0.1\times10^{-4}$ [1/deg].

Advantageous Effects of Invention

According to the present invention, it is possible to realize an imaging optical system having high resolution and high performance by applying a doublet lens called a wafer opt.

DESCRIPTION OF EMBODIMENTS

Hereinafter, embodiments of the present invention will be described with reference to the accompanying drawings.

In addition, the explanation will be given in following order.

1. First embodiment (first configuration example of an imaging lens that adopts an optical unit)

2. Second embodiment (second configuration example of an imaging lens that adopts an optical unit)

3. Third embodiment (third configuration example of an imaging lens that adopts an optical unit)

4. Fourth embodiment (fourth configuration example of an imaging lens that adopts an optical unit)

5. Fifth embodiment (concept of wafer opt)

6. Sixth embodiment (configuration example of an imaging apparatus)

1. First Embodiment

Figure 1:
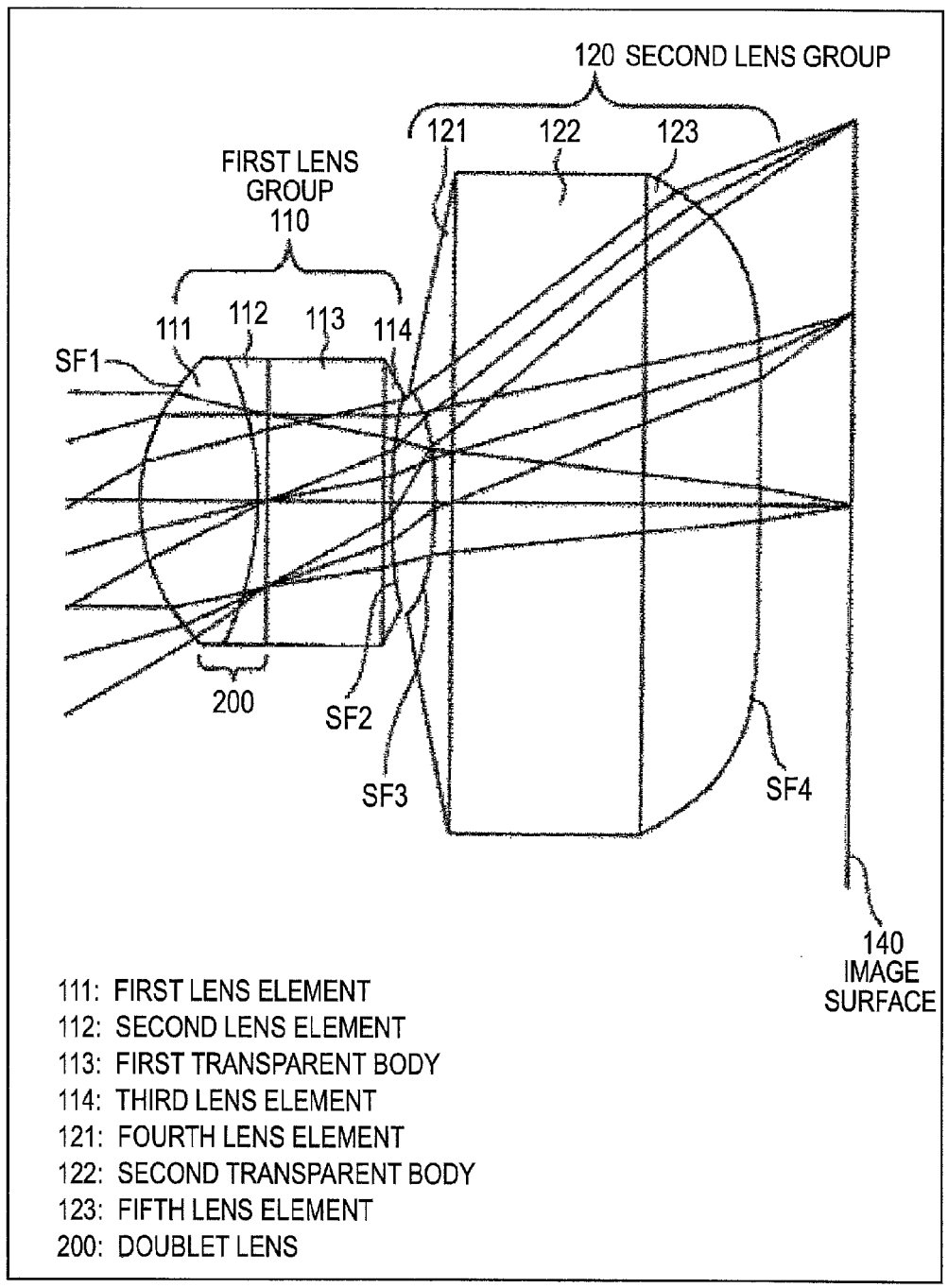
FIG. 1 is a view showing a configuration example of an imaging lens according to a first embodiment of the present invention.

FIG. 1 is a view showing a configuration example of an imaging lens that adopts an optical unit according to a first embodiment of the present invention.

As shown in FIG. 1, an imaging lens 100 according to the first embodiment includes has a first lens group 110, a second lens group 120, and an image surface 140 that are disposed in order from the object side OBJS toward the image surface side.

The imaging lens 100 is formed as a single focus lens. In addition, an optical unit is formed by the first and second lens groups 110 and 120.

Each of the first and second lens groups 110 and 120 is formed by the bonding body including a plurality of lens elements disposed with a transparent body interposed therebetween.

Specifically, the first lens group 110 is formed by the bonding body including a first lens element 111, a second lens element 112, a first transparent body 113, and a third lens element 114 that are disposed in order from the object side OBJS toward the image surface 140 side.

In addition, the first and second lens elements 111 and 112 form a doublet lens 200.

In the present embodiment, the first lens group 110 is formed of at least two or more resin materials that are disposed in order from the object side toward the image surface side and have different temperature refractive index changes. In addition, the first lens group 110 has at least one first lens element 111 with positive power and at least one second lens element 112 with negative power that overlap each other on the curved surface.

In addition, the first lens group 110 is characterized in that the temperature refractive index change (|dn/dt|) of the first lens element 111 with positive power is smaller than the temperature refractive index change (|dn/dt|) of the second lens element with negative power by at least $0.1\times10^{-4}$ [1/deg].

That is, in the first lens group 110, the first lens element 111 on the object side is formed using a lens with positive power that has a small temperature refractive index change, and the second lens element 112 is formed using a lens with negative power that has a large temperature refractive index change.

The first and second lens elements 111 and 112 have the same d-line refractive index and the same Abbe number. Here, the first lens element 111 is formed in a plano-convex shape, a glass substrate equivalent to Schott's BK7 is used as the transparent body (glass substrate) 112 in order to manufacture the transparent body cheaply, and a plano-concave lens is formed as the second lens element 113.

In the first embodiment, the Abbe number of the first and second lens elements 111 and 112 is set to 57.3, for example.

In addition, a diaphragm is realized by attaching a material that hardly allows light to be transmitted therethrough, such as a chromium film, on the object side of the glass substrate in advance.

Similarly, an IR cut filter is also attached on the glass substrate in advance by vapor deposition.

Due to these components, a chromatic aberration is corrected in the first lens group 110, and a structure where aberrations of the entire lens unit are easily corrected can be obtained.

The first lens group 110 has strong positive power as a whole, and this greatly contributes to a reduction in the optical length.

The second lens group 120 is formed by the bonding body including a fourth lens element 121, a second transparent body 122, and a fifth lens element 123 that are disposed in order from the object side OBJS toward the image surface 140 side.

In the second lens group 120, the fourth lens element 121 having a plano-concave shape is bonded to the object side of the glass substrate equivalent to BK7, and the fifth lens element 123 having a plano-convex shape is bonded to the opposite side of the glass substrate.

The fourth and fifth lens elements 121 and 123 have the same d Abbe number.

In the first embodiment, the Abbe number of the fourth and fifth lens elements 121 and 123 is set to 30, for example.

Since the first lens group 110 has strong positive power and the second lens group 120 has strong negative power, the optical path length is short. Accordingly, a lens unit whose chromatic aberration is satisfactorily corrected is obtained.

In addition, the third and fourth lens elements 114 and 121 face each other across the air, and both the third and fourth lens elements 114 and 121 have concave shapes. Accordingly, since there is a large difference between the lengths of upper and lower light beams passing through the air in a bunch of off-axis light, a comatic aberration and an astigmatism are satisfactorily corrected.

In addition, in the fifth lens element 123, the image surface is corrected since a transmission length changes with an image height. Thus, good properties as a camera lens are realized.

As described above, since each of the first and second lens groups 110 and 120 is formed by the bonding body including a lens element and a transparent body, the imaging lens 100 has a first surface SF1, a second surface SF2, a third surface SF3, and a fourth surface SF4 as lens surfaces as a whole.

The first surface SF1 is formed by the object side surface of the first lens element 111, and the second surface SF2 is formed by the image surface side surface of the third lens element 114.

The third surface SF3 is formed by the object side surface of the fourth lens element 121, and the fourth surface SF4 is formed by the image surface side surface of the fifth lens element 123.

In the imaging lens 100 that is a single focus lens, it is assumed that an imaging surface (image receiving surface) of a solid state imaging device, such as a CCD sensor or a CMOS sensor, is disposed as the image surface 140.

Cover glass (not shown) is disposed between the fourth surface SF4 and the image surface 140. Not only an infrared cut-off filter, a low pass filter, or cover glass formed of resin or glass but also optical members may be disposed between the fourth surface SF4 and the image surface 140.

In addition, in the present embodiment, the left side in FIG. 1 is an object side (front) and the right side is an image surface side (rear).

In addition, light beams incident from the object side are formed on the image surface 140.

Hereinafter, the configuration and operation of the imaging lens according to the present embodiment will be described.

The imaging lens 10 according to the present embodiment that is a single focus lens is configured such that the following conditional expressions (1) to (7) are satisfied.

In the conditional expression (1), the range of the constant of the temperature refractive index change of a glass material of the first lens element 111 is defined.

$$-1.5 \times 10^{-4} \leq dnL1/dt \leq -0.1 \times 10^{-4} \quad (1)$$

Here, dnL1/dt indicates a constant of the temperature refractive index change of the glass material of the first lens element 111.

The conditional expression (1) is necessary for the following reasons.

If the temperature refractive index change is increased, defocusing of the entire optical device due to temperature is increased. As a result, correction is not effective even if any kind of method is used. For this reason, a lower limit of the temperature refractive index change is necessary. The upper limit is determined by physical properties. It is difficult to realize the same temperature refractive index change as glass using a resin lens material, and the best value considered to be the maximum is the upper limit.

In the conditional expression (2), the range of the constant of the temperature refractive index change of a glass material of the second lens element 112 is defined.

$$-4.0 \times 10^{-4} \leq dnL2/dt \leq -0.4 \times 10^{-4} \quad (2)$$

Here, dnL2/dt indicates a constant of the temperature refractive index change of the glass material of the second lens element 112.

The conditional expression (2) is necessary for the following reasons.

Although the ability to correct the temperature defocusing of the device itself is increased as the lower limit becomes low, the value of the lower limit of the temperature refractive index change that is generally referred to at present for the resin lens material is the lower limit. If the upper limit becomes greater than this, it is not possible to correct the temperature-defocusing characteristic. In this manner, the upper limit is set.

The conditional expression (3) defines the radius of curvature of the first surface of incidence. Here, the first surface of incidence RS1 (SL11) is equivalent to the object side surface of the first lens element 111.

$$0.1 \leq RS1 \leq 100 \quad (3)$$

Here, RS1 indicates the radius of curvature [mm] of the first surface of incidence.

The conditional expression (3) is necessary for the following reasons.

If the radius of curvature of the first surface of incidence is lower than the lower limit, the power of the first lens element is too strong. For this reason, eccentric tolerances in manufacturing are not practical. In this manner, the lower limit is set. For the upper limit, since there is power and accordingly it is necessary to eliminate temperature defocusing in the present invention, power is necessary to some extent. In this manner, the upper limit is set.

The conditional expression (4) defines the radius of curvature of the second surface of incidence. Here, the second surface of incidence is equivalent to the image surface side surface of the first lens element 111, in other words, the object side surface SL12 of the second lens element 112.

$$-100 \leq RS2 \leq -0.1 \quad (4)$$

Here, RS1 indicates the radius of curvature [mm] of the first surface of incidence.

The conditional expression (4) is necessary for the following reasons.

If the radius of curvature of the second surface of incidence is lower than the lower limit, there is no power of a bonding portion. For this reason, it is not possible to eliminate the temperature defocusing of the entire device using materials with different temperature refractive index changes. In this manner, the lower limit is set. If the radius of curvature of the second surface of incidence exceeds the upper limit, the power of both lens is too strong. For this reason, eccentric tolerances in manufacturing are not practical. In this manner, the upper limit is set.

In the conditional expression (5), the absolute value difference between the d-line refractive index of the first lens element and the d-line refractive index of the second lens element is defined.

$$0.0 \leq |nL1 - nL2| \leq 0.1 \quad (5)$$

Here, nL1 indicates a d-line refractive index of the first lens element 111, and nL2 indicates a d-line refractive index of the second lens element 112.

The conditional expression (5) is necessary for the following reasons.

The lower limit is obtained when two glass materials having the same refractive index are used. As the value increases, reflection in a bonding portion increases. Since this is a cause of the generation of a ghost, flare, and the like, this is not desirable. In this manner, the upper limit is set.

In the conditional expression (6), the constant of the temperature refractive index change of a glass material of the third lens element 114 is defined.

$$1.5 \times 10^{-4} \leq dnL3/dt \leq -0.1 \times 10^{-4} \quad (6)$$

Here, dnL3/dt indicates a constant of the temperature refractive index change of the glass material of the third lens element 114.

The conditional expression (7) defines the radius of curvature of the third surface of incidence. Here, the third surface of incidence is equivalent to the object side surface SL13 of the third lens element 114.

$$0.1 \leq RS3 \leq 100 \quad (7)$$

Here, RS3 indicates the radius of curvature [mm] of the third surface of incidence.

The conditional expression (7) is necessary for the following reasons.

If the radius of curvature of the third surface of incidence is lower than the lower limit, the power of the third lens element is too strong. For this reason, eccentric tolerances in manufacturing are not practical. In this manner, the lower limit is set. For the upper limit, if the curvature is increased, the effect is no longer acquired even if materials with different temperature refractive index changes are used. In this manner, the upper limit is set.

The conditional expressions (1) to (7) described above are commonly applied to first to fourth examples related to the first to fourth embodiments described below. By adopting the conditional expressions (1) to (7) appropriately when necessary, more preferable image forming performance and compact optical system that are suitable for each imaging device or imaging apparatus are realized.

In addition, assuming that a direction from the object side toward the image surface side is positive, and k is a cone coefficient, A, B, C, and D are aspheric coefficients, and r is a central radius of curvature, the shape of the aspheric surface of a lens is expressed in the following expression. y indicates the height of light from the optical axis, and c indicates the inverse (1/r) of the central radius of curvature r.

In addition, X indicates a distance from the tangential plane to the aspheric vertex, and A, B, C, D, E, and F indicate a fourth-order aspheric coefficient, a six-order aspheric coefficient, an eighth-order aspheric coefficient, a tenth-order aspheric coefficient, a twelfth-order aspheric coefficient, and a fourteenth-order aspheric coefficient, respectively.

Equation of aspheric surface [Expression 1]

$$X = \frac{cy^2}{1 + \sqrt{1 - (1+k)c^2 y^2}} + Ay^4 + By^6 + Cy^8 + Dy^{10} + Ey^{12} + Fy^{14}$$

Figure 2:
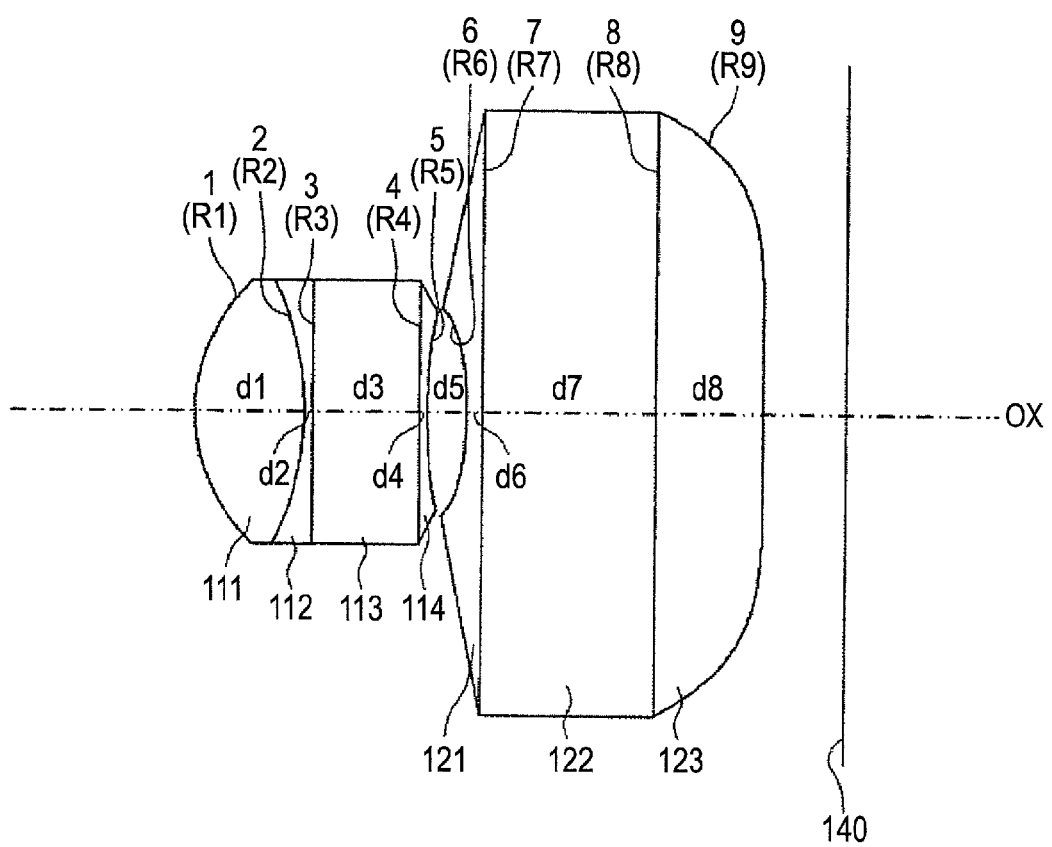
FIG. 2 is a view showing surface numbers given to each lens and each substrate, which are included in each lens group of the imaging lens according to the present embodiment, and cover glass that forms an imaging unit.

FIG. 2 is a view showing surface numbers given to each lens and each substrate, which are included in each lens group of the imaging lens according to the present embodiment, and cover glass that forms an imaging unit.

Specifically, the surface number of No. 1 (SL11) is given to the object side surface (convex surface) of the first lens element 111, and the surface number of No. 2 (SL12) is given to the boundary surface (bonding surface) between the image surface side surface of the first lens element 111 and the object side surface of the second lens element 112.

The surface number of No. 3 (SG11) is given to the boundary surface (bonding surface) between the image surface side surface of the second lens element 112 and the object side surface of the first transparent body (first glass substrate) 113.

The surface number of No. 4 (SG1R) is given to the boundary surface (bonding surface) between the image surface side surface of the first transparent body (first glass substrate) 113 and the object side surface of the third lens element 114. The surface number of No. 5 (SL1R) is given to the image surface side surface (concave surface) of the third lens element 114.

The surface number of No. 6 (SL21) is given to the object side surface (concave surface) of the fourth lens element 121, and the surface number of No. 7 (SG21) is given to the boundary surface (bonding surface) between the image surface side surface of the fourth lens element 121 and the object side surface of the second transparent body (second glass substrate) 122.

The surface number of No. 8 (SG2R) is given to the boundary surface (bonding surface) between the image surface side surface of the second transparent body (second glass substrate) 122 and the object side surface of the fifth lens element 123.

The surface number of No. 9 (SL2R) is given to the image surface side surface (aspheric surface) of the fifth lens element 123.

In addition, as shown in FIG. 2, in the imaging lens 100 according to the present embodiment, the central radius of curvature of the object side surface (No. 1) 1 of the first lens element 111 is set to R1.

The central radius of curvature of the boundary surface (bonding surface) 2 between the image surface side surface of the first lens element 111 and the object side surface of the second lens element 112 is set to R2.

The central radius of curvature of the boundary surface (bonding surface) 3 between the image surface side surface of the second lens element 112 and the object side surface of the first transparent body (first glass substrate) 113 is set to R3.

The central radius of curvature of the boundary surface (bonding surface) 4 between the image surface side surface of the first transparent body (first glass substrate) 113 and the object side surface of the third lens element 114 is set to R4, and the central radius of curvature of the image surface side surface (concave surface) 5 of the third lens element 114 is set to R5.

The central radius of curvature of the object side surface (concave surface) 6 of the fourth lens element 121 is set to R6, and the central radius of curvature of the boundary surface (bonding surface) 7 between the image surface side surface of the fourth lens element 121 and the object side surface of the second transparent body (second glass substrate) 122 is set to R7.

The central radius of curvature of the boundary surface (bonding surface) 8 between the image surface side surface of the second transparent body (second glass substrate) 122 and the object side surface of the fifth lens element 123 is set to R8.

The central radius of curvature of the image surface side surface (aspheric surface) 10 of the fifth lens element is set to R9.

In addition, the central radii of curvature R3, R4, R7, R8, and R9 of the surfaces 3, 4, 7, 8, and 9 are infinity. In addition, as shown in FIG. 2, a distance between the surfaces 1 and 2 on an optical axis OX, which is the thickness of the first lens element 111 is set to d1, and a distance between the surfaces 2 and 3 on the optical axis OX, which is the thickness of the second lens element 112, is set to d2.

A distance between the surfaces 3 and 4 on the optical axis OX, which is the thickness of the first transparent body (first glass substrate) 113, is set to d3, and a distance between the surfaces 4 and 5 on the optical axis OX, which is the thickness of the third lens element 114, is set to d4.

A distance between the image surface side surface 5 of the third lens element 114 and the object side surface 6 of the fourth lens element 121 on the optical axis OX is set to d5.

A distance between the surfaces 6 and 7 on the optical axis OX, which is the thickness of the fourth lens element 121, is set to d6, and a distance between the surfaces 7 and 8 on the optical axis OX, which is the thickness of the second transparent body (second glass substrate) 122, is set to d7.

A distance between the surfaces 8 and 9 on the optical axis OX, which is the thickness of the fifth lens element 123, is set to d8.

Hereinafter, specific values of the imaging lens 100 will be shown by way of first example. In addition, in the first example, the surface numbers shown in FIG. 2 are given to the lens element and the glass substrate (transparent body) of the imaging lens 100.

Figure 3:
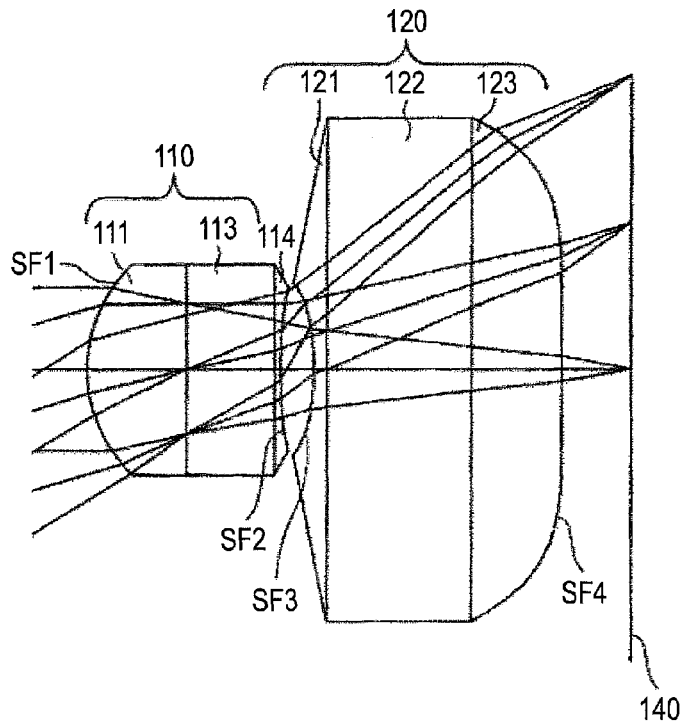
FIG. 3 is a view showing a configuration example of an imaging lens in a first comparative example.

In addition, as a first comparative example of the first example, lens configuration data of an imaging lens 100CMP1 having a configuration shown in FIG. 3 is shown below. In the imaging lens 100CMP1 of the first comparative example, the same components as in the imaging lens 100 according to the first embodiment are denoted by the same reference numerals in order to facilitate the understanding.

The imaging lens 100CMP1 of the first comparative example does not have a doublet configuration since there is no second lens element in a first lens group 110CMP1.

First Example

Each value in the first example is shown in Tables 1, 2, 3, and 4. Each value in the first example corresponds to the imaging lens 100 in FIG. 1.

The first example is a design example for a 3-megapixel CMOS imager having a ⅕ size and a 1.4 μm pitch.

As described above, the imaging lens 100 is configured to include the first and second lens groups 110 and 120, and the first lens group 110 is formed as follows.

The first lens group 110 is formed by dividing the inside of a first lens element 111CMP in the first comparative example into two parts.

That is, the first and second lens elements 111 and 112 are bonded to each other from the object side to form a lens. Accordingly, at room temperature, this lens performs the same operation as the first lens element 111CMP in the first comparative example using two lenses.

The first and second lens elements 111 and 112 have the same Abbe number 57.3 and the same d-line refractive index 1.51.

In addition, the first lens element 111 is formed of a material whose temperature refractive index change (dn/dt) is $-0.87 \times 10^{-4}$ [1/deg], and the second lens element 112 is formed of a material whose temperature refractive index change (dn/dt) is $-2.0 \times 10^{-4}$ [1/deg].

Figure 4:
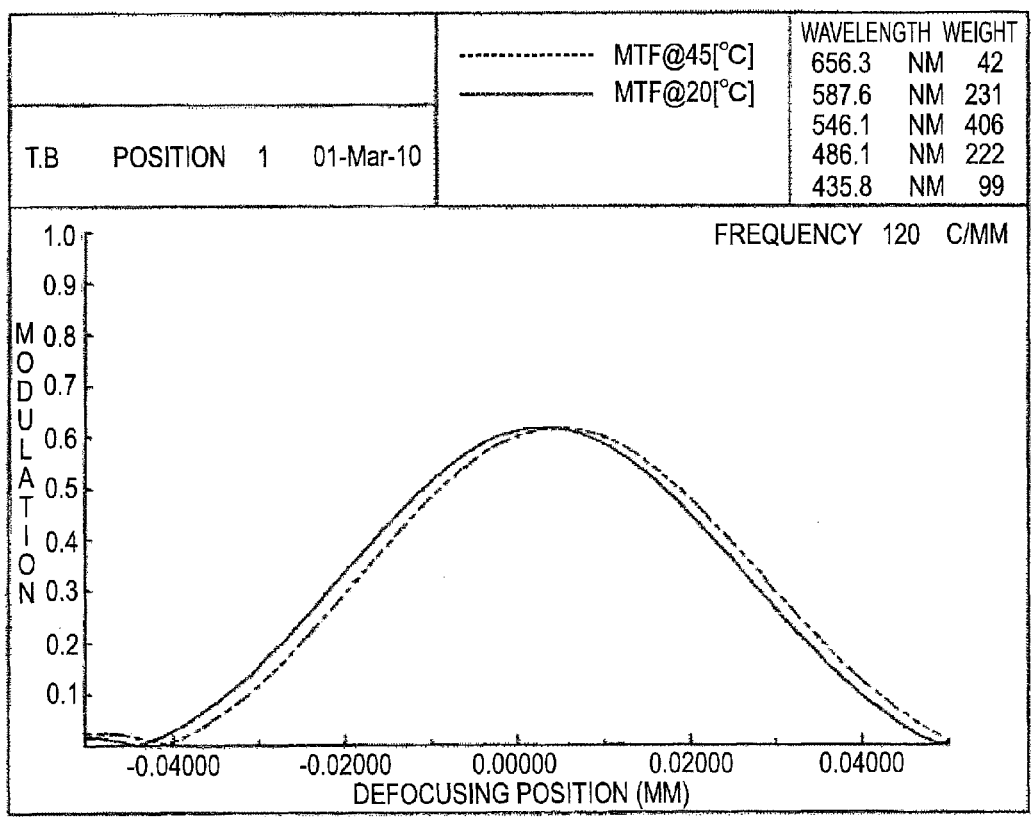
FIG. 4 is a view showing the defocusing characteristic of MTF of an imaging lens in a first example.

By adopting such a configuration, as shown in FIG. 4, a focus change at temperature of 25° C. can be reduced to approximately 0.

Thus, in the embodiment of the present invention, materials with different temperature refractive index changes are used in order to suppress the characteristic change of the entire device due to temperature.

The principle of reducing a defocus change due to temperature is as follows.

In a single focus lens, assuming that all lenses have temperature refractive index changes of fixed negative coefficients, the focal length is moved to the positive side if the temperature rises.

In order to suppress this, as shown in this example, the lens with positive power is divided into a lens with positive power and a lens with negative power, and the lens with negative power is formed of a material having a larger temperature refractive index change than the lens with positive power, for example. In this case, defocusing of the entire device due to temperature change can be suppressed compared with that when the lens with positive power is not divided.

In this example, the first and second lens elements 111 and 112 are configured to have the same room temperature refractive index and the same room temperature Abbe number, the first and second lens elements 111 and 112 may also be configured to have different room temperature refractive indices and different room temperature Abbe numbers.

Table 1 shows a radius of curvature (R: mm), a distance (d: mm), a refractive index (nd), and a dispersion value (vd) of each lens element and each glass substrate (transparent body) corresponding to the surface number of the imaging lens in the first example.

TABLE 1

Lens configuration data in the first example

| Surface number | | R | d | nd | vd |
|---|---|---|---|---|---|
| 1 | SL11: | 0.894 | 0.558 | 1.51 | 57.3 |
| 2 | SL12: | −1.500 | 0.040 | 1.51 | 57.3 |
| 3 | SG11: | INFINITY | 0.550 | 1.81 | 40.9 |
| 4 | SG1R: | INFINITY | 0.040 | 1.51 | 57.3 |
| 5 | SL1R: | 3.231 | 0.205 | | |
| 6 | SL21: | −2.169 | 0.079 | 1.60 | 30.0 |
| 7 | SG21: | INFINITY | 0.900 | 1.52 | 55.0 |
| 8 | SG2R: | INFINITY | 0.550 | 1.60 | 30.0 |
| 9 | SL2R: | 31.258 | 0.435 | | |

Table 2 shows fourth-order, six-order, eighth-order, and tenth-order aspheric coefficients of the surface 1 of the first lens element 111, the surface 5 of the second lens element 114, the surface 6 of the fourth lens element 121, and the surface 10 of the fifth lens element 124 including the aspheric surfaces in the first example.

In Table 2, K indicates a cone constant, and A, B, C, and D indicate a fourth-order aspheric coefficient, a six-order aspheric coefficient, an eighth-order aspheric coefficient, and a tenth-order aspheric coefficient, respectively.

TABLE 2

Aspheric surface data in the first example

| | | | | | | | | | |
|---|---|---|---|---|---|---|---|---|---|
| SL11 surface | K: −4.525 | A: 0.750E+00 | B: −0.945E+00 | C: 0.154E+01 | D: −0.965E+00 |
| SL1R surface | K: 0.101 | A: 0.225E−01 | B: 0.726E+00 | C: −0.271E+01 | D: 0.788E+01 |
| SL21 surface | K: 10.000 | A: −0.425E+00 | B: 0.269E+00 | C: −0.186E+01 | D: −0.4637E+01 |
| SL2R surface | K: 10.000 | A: −0.398E−01 | B: −0.207E−01 | C: −0.342E−02 | D: 0.535E−03 |

Table 3 specifically shows the focal length f, numerical aperture F, half angle of view ω, and lens length H of the imaging lens 100 in the first example.

Here, the focal length f is set to 2.91 [mm], the numerical aperture F is set to 2.8, the half angle of view ω is set to 31.4 deg, and the lens length H is set to 3.36 [mm].

TABLE 3

Configuration data in the first example f (focal length) = 2.91 mm
F (numerical aperture) = 2.8
ω (half angle of view) = 31.4 deg
H (lens length) = 3.36 mm Table 4 shows that the above-described conditional expressions (1) to (7) are satisfied in the first example.

TABLE 4

Numerical values of conditions expression in each example
Conditional expression/first example

| | |
|---|---|
| (1) | −0.87 × 10$^{-4}$ |
| (2) | −2.0 × 10$^{-4}$ |
| (3) | 0.894 |
| (4) | −1.5 |
| (5) | 0 |
| (6) | — |
| (7) | — |

As shown in Table 4, in the first example, the constant dnL1/dt of the temperature refractive index change of the glass material of the first lens element 111 is set to −0.87× 10$^{-4}$. Accordingly, the conditions defined in the conditional expression (1) are satisfied.

The constant dnL2/dt of the temperature refractive index change of the glass material of the second lens element 112 is set to −2.0×10$^{-4}$. Accordingly, the conditions defined in the conditional expression (2) are satisfied.

The radius of curvature RS1 of the first surface of incidence is set to 0.894. Accordingly, the conditions defined in the conditional expression (3) are satisfied.

The radius of curvature RS2 of the second surface of incidence is set to −1.5. Accordingly, the conditions defined in the conditional expression (4) are satisfied.

An absolute value difference between the d-line refractive index nL1 of the first lens element 111 and the d-line refractive index nL2 of the second lens element 112 is set to 0. Accordingly, the conditions defined in the conditional expression (5) are satisfied.

In addition, in the first example, the conditional expressions (6) and (7) are not particularly defined.

Figure 5:
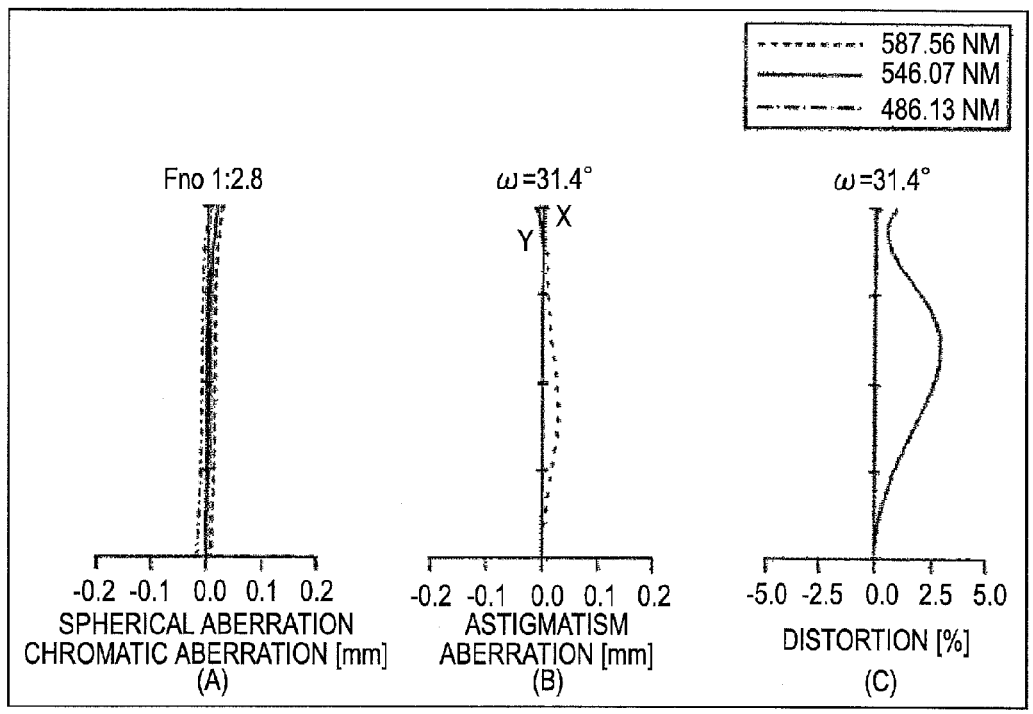
FIG. 5 is an aberration diagram showing a spherical aberration, an astigmatism, and distortion in the first example.

FIG. 5 is an aberration diagram showing a spherical aberration (chromatic aberration), an astigmatism, and distortion in the first example. (A) in FIG. 5 shows the spherical aberration (chromatic aberration), (B) in FIG. 5 shows the astigmatism, and (C) in FIG. 5 shows the distortion.

As can be seen from FIG. 5, according to the first example, all aberrations including the spherical surface, astigmatism, and distortion are satisfactorily corrected. As a result, an imaging lens including an optical unit excellent in image forming performance is obtained.

In addition, according to the first example, as shown in FIG. 4, a focus change at temperature of 25° C. can be reduced to approximately 0.

First Comparative Example

Here, a comparative example shown in FIG. 3 will be described.

The first comparative example is a design example for a 3-megapixel CMOS imager having a ⅓ size and a 1.4 μm pitch.

The imaging lens 100CMP1 of the first comparative example does not have a doublet configuration since there is no second lens element in the first lens group 110CMP1.

Table 5 shows a radius of curvature (R: mm), a distance (d: mm), a refractive index (nd), and a dispersion value (vd) of each lens element and each glass substrate (transparent body) corresponding to the surface number of the imaging lens in the first comparative example.

TABLE 5

Lens configuration data in the first comparative example

| Surface number | | R | d | nd | vd |
|---|---|---|---|---|---|
| 1 | SL11: | 0.894 | 0.558 | 1.51 | 57.3 |
| 2 | SG11: | INFINITY | 0.550 | 1.81 | 40.9 |
| 3 | SG1R: | INFINITY | 0.040 | 1.51 | 57.3 |
| 4 | SL1R: | 3.231 | 0.205 | | |
| 5 | SL21: | −2.169 | 0.079 | 1.60 | 30.0 |
| 6 | SG21: | INFINITY | 0.900 | 1.52 | 55.0 |
| 7 | SG2R: | INFINITY | 0.550 | 1.60 | 30.0 |
| 8 | SL2R: | 31.258 | 0.435 | | |

In the first comparative example, lens configuration data shown in Table 5 is illustrated. The aspheric surface data is similar to Table 2, and the configuration data is similar to Table 3.

As described above, the imaging lens 100CMP1 in the first comparative example is configured to include the first and second lens groups 110 and 120, and the first lens group 110 is configured as follows.

The first lens element 111 having a plano-convex shape and the Abbe number 57.3 is bonded to the object side of the glass substrate equivalent to BK7, and the third lens element 114 having a plano-concave shape and the Abbe number 57.3 is bonded to the opposite side of the glass substrate.

Here, a diaphragm is realized by attaching a material that hardly allows light to be transmitted therethrough, such as a chromium film, on the object side of the glass substrate in advance.

In addition, an IR cut filter is also added.

In the second lens group 120, the fourth lens element 121 having a plano-concave shape and the Abbe number 30 is bonded to the object side of the glass substrate equivalent to BK7, and the fifth lens element 123 having a plano-convex shape and the Abbe number 30 is bonded to the opposite side of the glass substrate. Here, the first lens group 110CMP1 has strong positive power and the second lens group 120 has strong negative power. Accordingly, since the optical path length is short, a lens unit whose chromatic aberration is satisfactorily corrected is obtained. In addition, the third and fourth lens elements 114 and 121 face each other across the air, and both the third and fourth lens elements 114 and 121 have concave shapes. Accordingly, since there is a large difference between the lengths of upper and lower light beams passing through the air in a bunch of off-axis light, a comatic aberration and an astigmatism are satisfactorily corrected.

In addition, in the fifth lens element 123, the image surface is corrected since a transmission length changes with an image height. Thus, good properties as a camera lens are realized.

Here, in the first comparative example, characteristics at room temperature are excellent. However, the temperature refractive index change (dn/dt) of the first and third lens elements 111 and 114 is $-0.87 \times 10^{-4}$ [1/deg], and the temperature refractive index change (dn/dt) of the fourth and fifth lens elements 121 and 123 is $-1.50 \times 10^{-4}$ [1/deg].

Figure 6:
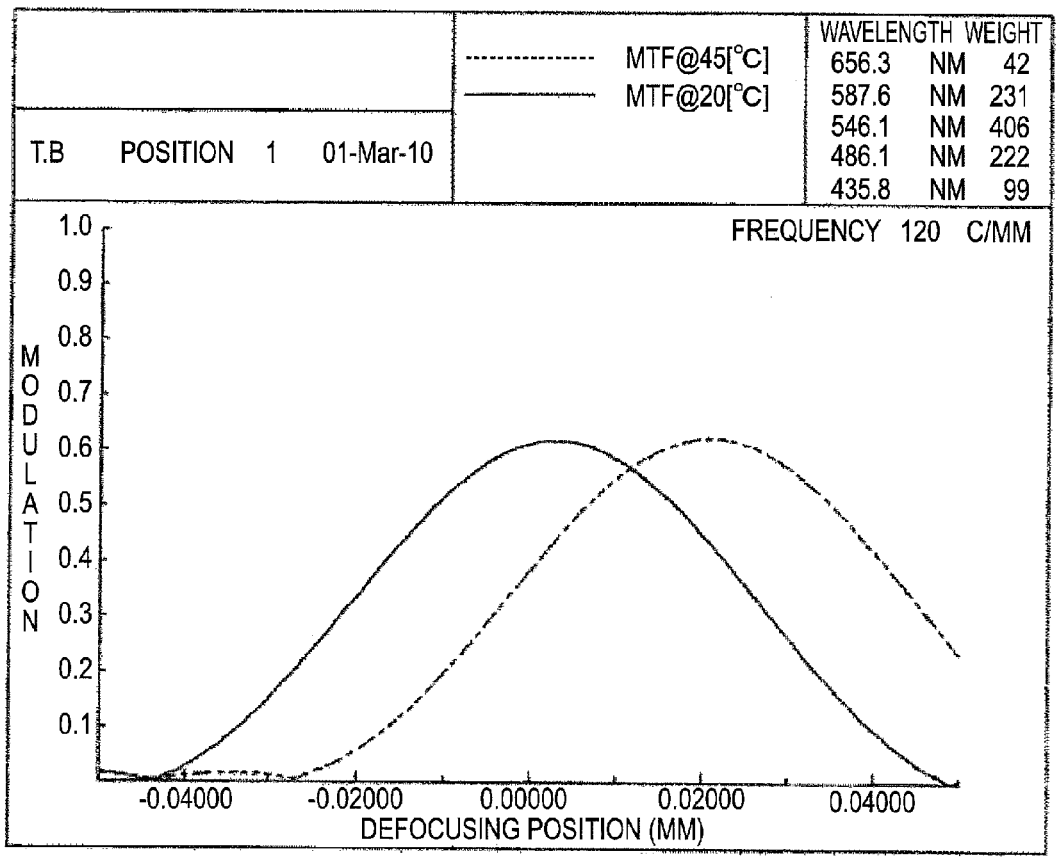
FIG. 6 is a view showing the defocusing characteristic of MTF of the imaging lens in the first comparative example.

For these reasons, as shown in FIG. 6, as temperature defocusing of the entire device, a defocus change of 20 [μm] is caused with a change of 25° C. This is a problem in the practical specification.

2. Second Embodiment

Figure 7:
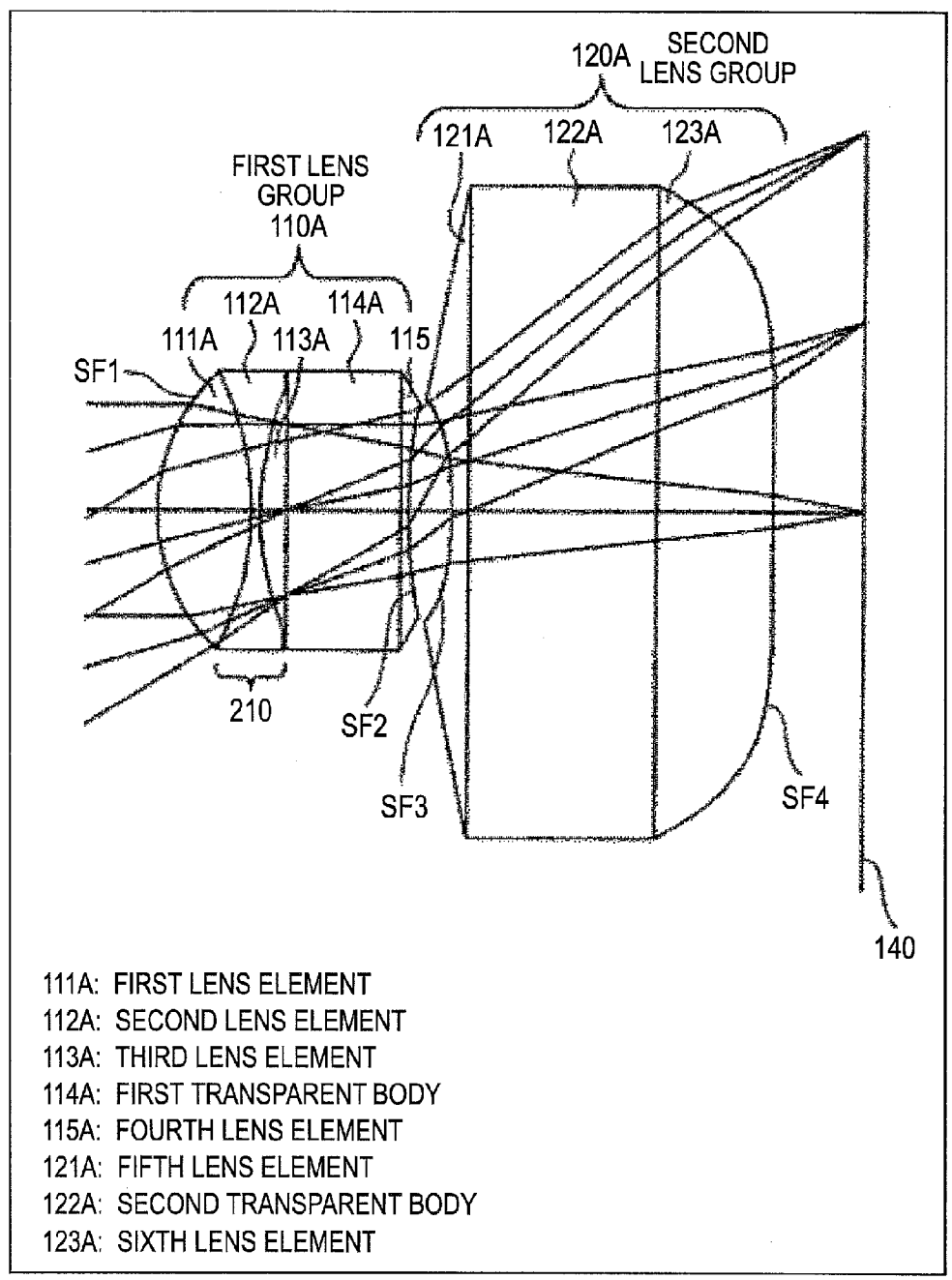
FIG. 7 is a view showing a configuration example of an imaging lens according to a second embodiment of the present invention.

FIG. 7 is a view showing a configuration example of an imaging lens according to a second embodiment of the present invention.

An imaging lens 100A according to the second embodiment shown in FIG. 7 is different from the imaging lens 100 according to the first embodiment shown in FIG. 1 in the following point.

A first lens group 110A of the imaging lens 100A includes a first lens element 111A, a second lens element 112A, a third lens element 113A, a first transparent body 114A, and a fourth lens element 115.

The first lens group 110A shown in FIG. 7 is formed by a triplet 210, which is the bonding body of three lens elements located on the object side surface of the first transparent body 114A, instead of the doublet 200 using the two first and second lens elements 111 and 112.

In addition, surface number SL13 is given to the surface of the third lens element 113A bonded to the image surface side surface of the second lens element 112A.

The triplet 210 is formed by the bonding body of the first lens element 111A, the second lens element 112A, and the third lens element 113A.

Only the reference numerals or names are different, and the first transparent body 114A corresponds to the first transparent body 113 in FIG. 1 and the fourth lens element 115 corresponds to the third lens element 114 in FIG. 1.

The second lens group 120A includes a fifth lens element 121A, a second transparent body 122A, and a sixth lens element 123A.

Basically, the second lens group 120A shown in FIG. 7 has the same configuration and function as the second lens group 120 shown in FIG. 1.

The fifth lens element 121A in FIG. 7 corresponds to the fourth lens element 121 in FIG. 1, the second transparent body 122A in FIG. 7 corresponds to the second transparent body 122 in FIG. 1, and the sixth lens element 123A in FIG. 7 corresponds to the fifth lens element 123 in FIG. 1.

Hereinafter, specific values of the imaging lens 100A will be shown by way of second example. In addition, in the second example, the surface numbers shown in FIG. 2 are given. In addition, surface number SL13 is given to the surface of the third lens element 113A bonded to the image surface side surface of the second lens element 112A.

Second Example

As described above, in the second example, the inside of the first lens element 111CMP1 in the first comparative example is divided into three material parts.

The first to third lens elements 111A to 113A are bonded to each other from the object side to form a lens. Accordingly, at room temperature, this lens performs the same operation as the first lens element 111CMP1 in the first comparative example using three lenses.

Here, the first to third lens elements 111A to 113A also have the same d-line refractive index and the same d-line Abbe number.

The first lens element 111A is formed of a material whose temperature refractive index change (dn/dt) is $-0.87 \times 10^{-4}$ [1/deg], the second lens element 112A is formed of a material whose temperature refractive index change (dn/dt) is $-1.6 \times 10^{-4}$ [1/deg], and the third lens element 113A is formed of a material whose temperature refractive index change (dn/dt) is $-0.87 \times 10^{-4}$ [1/deg].

By adopting such a configuration, defocusing can be reduced to approximately 0 in the second example although defocusing of 20 [μm] occurs with a change of 25° C. in the first comparative example.

Thus, in the second embodiment of the present invention, materials with different temperature refractive index changes are used in order to suppress the characteristic change of the entire device due to temperature.

Although the principle of reducing a focus change due to temperature is the same as the first example, a negative lens with stronger power can be configured by dividing the lens element into three parts. Although the temperature refractive index change of the negative lens can be canceled at $-2.0 \times 10^{-4}$ [1/deg] in the first example, the temperature refractive index change of the negative lens can be canceled at $-1.6 \times 10^{-4}$ [1/deg].

In this example, the first to third lens elements 111A to 113A are configured to have the same room temperature refractive index and the same room temperature Abbe number. However, the first to third lens elements 111A to 113A may also be configured to have different room temperature refractive indices and different room temperature Abbe numbers.

Table 6 shows a radius of curvature (R: mm), a distance (d: mm), a refractive index (nd), and a dispersion value (vd) of each lens element and each glass substrate (transparent body) corresponding to the surface number of the imaging lens in the second example.

TABLE 6

| Lens configuration data in the second example | | | | |
|---|---|---|---|---|
| Surface number | R | d | nd | vd |
| 1 SL11: | 0.894 | 0.438 | 1.51 | 57.3 |
| 2 SL12: | −1.500 | 0.040 | 1.51 | 57.3 |
| 3 SL13: | 1.500 | 0.120 | 1.51 | 57.3 |
| 4 SG11: | INFINITY | 0.550 | 1.81 | 40.9 |
| 5 SG1R: | INFINITY | 0.040 | 1.51 | 57.3 |
| 6 SL1R: | 3.231 | 0.205 | | |

TABLE 6-continued

Lens configuration data in the second example

| Surface number | | R | d | nd | vd |
|---|---|---|---|---|---|
| 7 | SL21: | −2.169 | 0.079 | 1.60 | 30.0 |
| 8 | SG21: | INFINITY | 0.900 | 1.52 | 55.0 |
| 9 | SG2R: | INFINITY | 0.550 | 1.60 | 30.0 |
| 10 | SL2R: | 31.258 | 0.435 | | |

In the second example, lens configuration data shown in Table 6 is illustrated.

The aspheric surface data is similar to Table 2, and the configuration data is similar to Table 3. In addition, longitudinal aberration characteristics are the same as those in FIG. 5.

Table 7 shows that the above-described conditional expressions (1) to (7) are satisfied in the second example.

TABLE 7

Numerical values of conditions expression in each example
Conditional expression/second example

| (1) | $-0.87 \times 10^{-4}$ |
|---|---|
| (2) | $-1.6 \times 10^{-4}$ |
| (3) | 0.894 |
| (4) | −1.5 |
| (5) | 0 |
| (6) | $-0.87 \times 10^{-4}$ |
| (7) | 1.5 |

As shown in Table 7, in the second example, the constant dnL1/dt of the temperature refractive index change of the glass material of the first lens element 111 is set to $-0.87 \times 10^{-4}$. Accordingly, the conditions defined in the conditional expression (1) are satisfied.

The constant dnL2/dt of the temperature refractive index change of the glass material of the second lens element 112 is set to $-1.6 \times 10^{-4}$. Accordingly, the conditions defined in the conditional expression (2) are satisfied.

The radius of curvature RS1 of the first surface of incidence is set to 0.894. Accordingly, the conditions defined in the conditional expression (3) are satisfied.

The radius of curvature RS2 of the second surface of incidence is set to −1.5. Accordingly, the conditions defined in the conditional expression (4) are satisfied.

An absolute value difference between the d-line refractive index nL1 of the first lens element 111 and the d-line refractive index nL2 of the second lens element 112 is set to 0. Accordingly, the conditions defined in the conditional expression (5) are satisfied.

The constant dnL3/dt of the temperature refractive index change of the glass material of the third lens element 113A is set to $-0.87 \times 10^{-4}$. Accordingly, the conditions defined in the conditional expression (6) are satisfied.

The radius of curvature RS3 of the third surface of incidence is set to 1.5. Accordingly, the conditions defined in the conditional expression (7) are satisfied.

3. Third Embodiment

Figure 8:
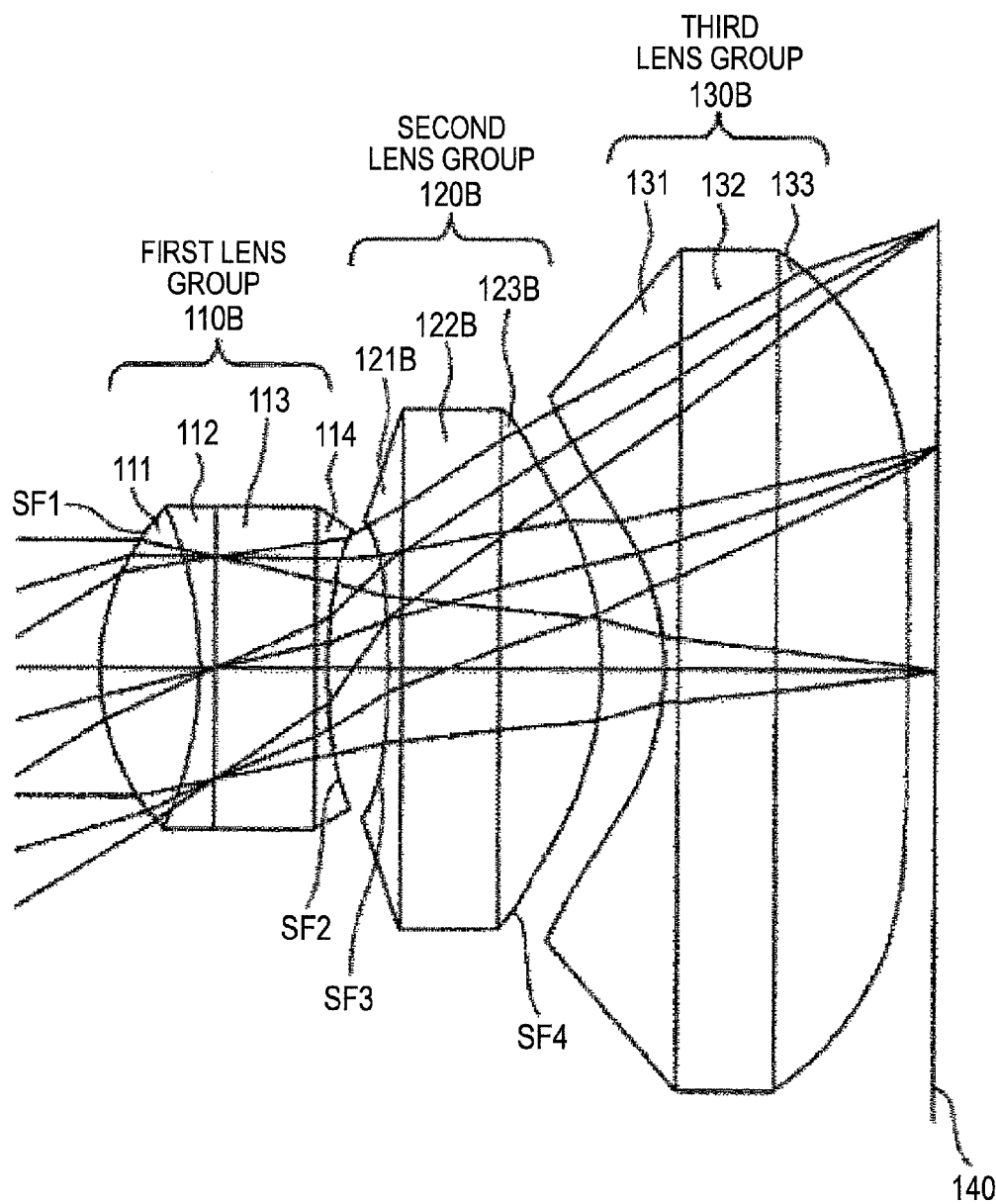
FIG. 8 is a view showing a configuration example of an imaging lens according to a third embodiment of the present invention.

FIG. 8 is a view showing a configuration example of an imaging lens according to a third embodiment of the present invention.

The difference between an imaging lens 100B according to the third embodiment shown in FIG. 8 and the imaging lens according to the first embodiment is as follows.

The imaging lens 100B is formed to have a 3-group configuration, and includes a first lens group 110B, a second lens group 120B, and a third lens group 130B.

Basically, the first lens group 110B has the same configuration as the first lens group 110 in the first embodiment.

The second lens group 1203 is formed by the bonding body of a fourth lens element 121B, a second transparent body 122B, and a fifth lens element 123B.

Similar to the second lens group, the third lens group 130B is formed by the bonding body of a sixth lens element 131, a third transparent body 132, and a seventh lens element 133.

In the imaging lens 100B, the second and third lens groups 120B and 130B are configured as follows.

The second lens group 120B is formed by a hybrid lens using a glass substrate, and a lens element with the Abbe number 30, for example, is bonded to top and bottom surfaces of the glass substrate equivalent to BK7.

The characteristic of the second lens group 120B is that the second lens group 120B has positive power since the lenses are not largely curved.

This is because especially the first and third lens groups 110B and 130B largely contribute to aberration correction and accordingly, the curving of the second lens group 120B is not necessary.

Since the second lens group 120B is not largely curved, AR coating can be accurately performed. Accordingly, it is difficult for a ghost or flare to appear.

In addition, since the thickness of a lens can be reduced, the manufacturing process becomes easily. This is an advantage of the present embodiment.

The third lens group 130B is also formed by a hybrid lens, and the sixth lens element 131 having an approximately plano-concave shape and the Abbe number 30.0, for example, is bonded to the object side surface of the glass substrate equivalent to BK7. In the third lens group 130B, the seventh lens element 133 having an approximately plano-convex shape and the Abbe number 57.3 is bonded to the opposite side.

Since the third lens group 130B has large negative power, the surface of incidence is largely curved toward the object side.

Since the center of curvature comes near the diaphragm, the astigmatism and the comatic aberration are satisfactorily corrected.

In addition, since the shape does not deviate significantly from the spherical shape, there is little change in the astigmatism with respect to the incidence NA due to image height. Therefore, a bright lens can be realized.

In addition, the emission side surface is also curved approximately toward the object side to become a shape that is convex on the image side. Accordingly, a structure is obtained in which it is difficult for a ghost to appear.

In addition, since the angle of incidence of light to the imager can be kept low until the light reaches the outer peripheral portion, preferable performance is obtained as the characteristics of a camera.

Although an example where all three lens groups are formed using a hybrid lens has been described herein, the second and third lens groups may be formed using various types of lens other than the hybrid lens.

For example, the second and third lens groups may be formed using a plastic molded lens, glass molded lens, a thermosetting resin lens or an injection molded heat-resistant resin lens, or a lens that is integrally molded in the form of a wafer.

Figure 9:
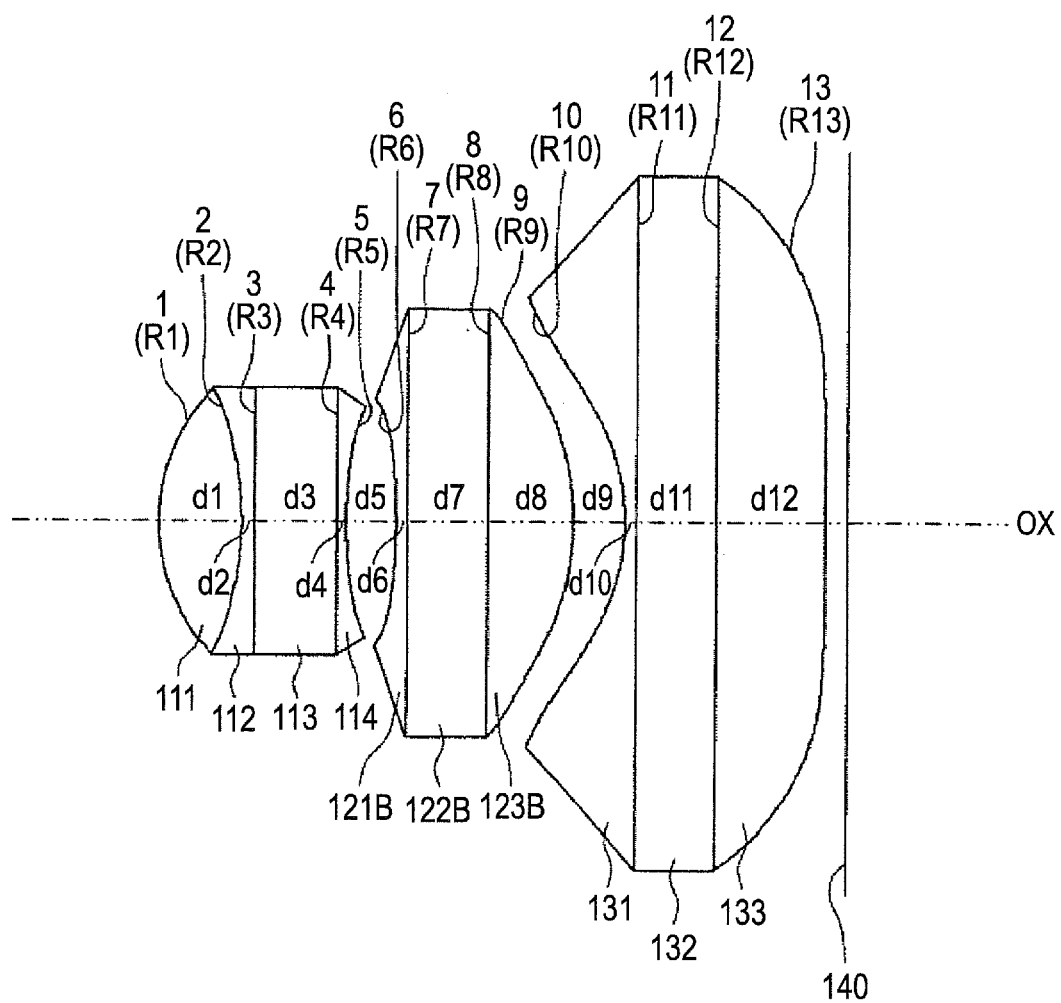
FIG. 9 is a view showing surface numbers given to each lens and each substrate, which are included in each lens group of the imaging lens according to the third embodiment, and cover glass that forms an imaging unit.

FIG. 9 is a view showing surface numbers given to each lens and each substrate, which are included in each lens group of the imaging lens according to the third embodiment, and cover glass that forms an imaging unit.

Specifically, the surface number of No. 1 (SL11) is given to the object side surface (convex surface) of the first lens element 111, and the surface number of No. 2 (SL12) is given to the boundary surface (bonding surface) between the image surface side surface of the first lens element 111 and the object side surface of the second lens element 112.

The surface number of No. 3 (SG11) is given to the boundary surface (bonding surface) between the image surface side surface of the second lens element 112 and the object side surface of the first transparent body (first glass substrate) 113.

The surface number of No. 4 (SG1R) is given to the boundary surface (bonding surface) between the image surface side surface of the first transparent body (first glass substrate) 113 and the object side surface of the third lens element 114. The surface number of No. 5 (SL1R) is given to the image surface side surface (concave surface) of the third lens element 114.

The surface number of No. 6 (SL21) is given to the object side surface (concave surface) of the fourth lens element 121B, and the surface number of No. 7 (SG21) is given to the boundary surface (bonding surface) between the image surface side surface of the fourth lens element 121B and the object side surface of the second transparent body (second glass substrate) 122B.

The surface number of No. 8 (SG2R) is given to the boundary surface (bonding surface) between the image surface side surface of the second transparent body (second glass substrate) 122B and the object side surface of the fifth lens element 123B.

The surface number of No. 9 (SL2R) is given to the image surface side surface (aspheric surface) of the fifth lens element 123B.

The surface number of No. 10 (SL31) is given to the object side surface of the sixth lens element 131, and the surface number of No. 11 (SG31) is given to the boundary surface (bonding surface) between the image surface side surface of the sixth lens element 131 and the object side surface of the third transparent body 132.

The surface number of No. 12 (SG3R) is given to the boundary surface (bonding surface) between the image surface side surface of the third transparent body 131 and the object side surface of the seventh lens element 133.

The surface number of No. 13 (SL3R) is given to the image surface side surface of the seventh lens element 133.

In addition, as shown in FIG. 9, in the imaging lens 100 according to the present embodiment, the central radius of curvature of the object side surface (No. 1) 1 of the first lens element 111 is set to R1.

The central radius of curvature of the boundary surface (bonding surface) 2 between the image surface side surface of the first lens element 111 and the object side surface of the second lens element 112 is set to R2.

The central radius of curvature of the boundary surface (bonding surface) 3 between the image surface side surface of the second lens element 112 and the object side surface of the first transparent body (first glass substrate) 113 is set to R3.

The central radius of curvature of the boundary surface (bonding surface) 4 between the image surface side surface of the first transparent body (first glass substrate) 113 and the object side surface of the third lens element 114 is set to R4, and the central radius of curvature of the image surface side surface (concave surface) 5 of the third lens element 114 is set to R5.

The central radius of curvature of the object side surface (concave surface) 6 of the fourth lens element 121B is set to R6, and the central radius of curvature of the boundary surface (bonding surface) 7 between the image surface side surface of the fourth lens element 121B and the object side surface of the second transparent body (second glass substrate) 122B is set to R7.

The central radius of curvature of the boundary surface (bonding surface) 8 between the image surface side surface of the second transparent body (second glass substrate) 122B and the object side surface of the fifth lens element 123 is set to R8.

The central radius of curvature of the image surface side surface (aspheric surface) 10 of the fifth lens element 123B is set to R9.

The central radius of curvature of the object side surface 10 of the sixth lens element 131 is set to R10.

The central radius of curvature of the boundary surface (bonding surface) 11 between the image surface side surface of the sixth lens element 131 and the object side surface of the third transparent body 132 is set to R11.

The central radius of curvature of the boundary surface (bonding surface) 13 between the image surface side surface of the third transparent body 132 and the object side surface of the seventh lens element 133 is set to R12.

The central radius of curvature of the image surface side 13 of the seventh lens element 133 is set to R13.

In addition, the central radii of curvature R3, R4, R7, R8, R11, and R12 of the surfaces 3, 4, 7, 8, 11, and 12 are infinity.

In addition, as shown in FIG. 9, a distance between the surfaces 1 and 2 on the optical axis OX, which is the thickness of the first lens element 111 is set to d1, and a distance between the surfaces 2 and 3 on the optical axis OX, which is the thickness of the second lens element 112, is set to d2.

A distance between the surfaces 3 and 4 on the optical axis OX, which is the thickness of the first transparent body (first glass substrate) 113, is set to d3, and a distance between the surfaces 4 and 5 on the optical axis OX, which is the thickness of the third lens element 114, is set to d4.

A distance between the image surface side surface 5 of the third lens element 114 and the object side surface 6 of the fourth lens element 121 on the optical axis OX is set to d5.

A distance between the surfaces 6 and 7 on the optical axis OX, which is the thickness of the fourth lens element 121B, is set to d6, and a distance between the surfaces 7 and 8 on the optical axis OX, which is the thickness of the second transparent body (second glass substrate) 122B, is set to d7.

A distance between the surfaces 8 and 9 on the optical axis OX, which is the thickness of the fifth lens element 123B, is set to d8.

A distance between the image surface side surface 9 of the fifth lens element 123B and the object side surface 10 of the sixth lens element 131 on the optical axis OX is set to d9.

A distance between the surfaces 10 and 11 on the optical axis OX, which is the thickness of the sixth lens element 131, is set to d10, and a distance between the surfaces 11 and 12 on the optical axis OX, which is the thickness of the third transparent body 132, is set to d11.

A distance between the surfaces 12 and 13 on the optical axis OX, which is the thickness of the seventh lens element 133, is set to d12.

Hereinafter, specific values of the imaging lens 100B will be shown by way of a third example. In addition, in the third example, the surface numbers shown in FIG. 9 are given to the lens element and the glass substrate (transparent body) of the imaging lens 100B.

Figure 10:
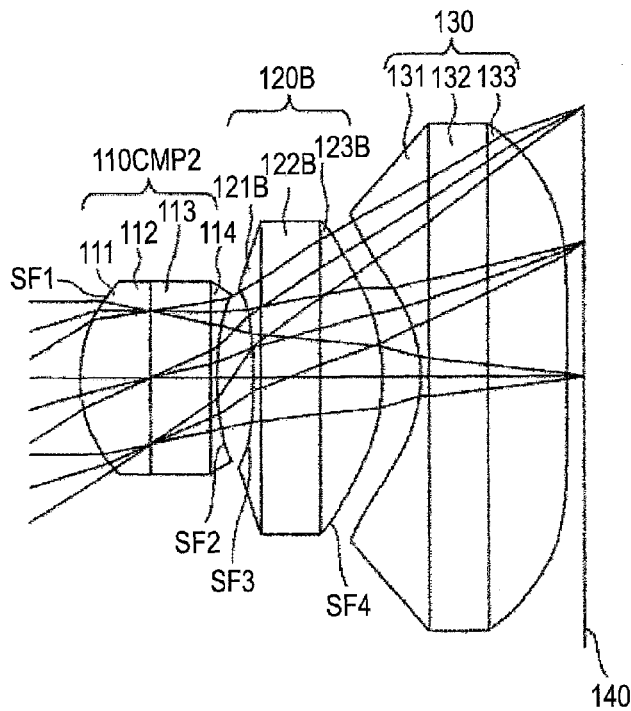
FIG. 10 is a view showing a configuration example of an imaging lens in the first comparative example.

In addition, as a second comparative example of the third example, lens configuration data of an imaging lens 100CMP2 having a configuration shown in FIG. 10 is shown below. In the imaging lens 100CMP2 of the second comparative example, the same components as in the imaging lens 100B according to the third embodiment are denoted by the same reference numerals in order to facilitate the understanding.

The imaging lens 100CMP2 of the second comparative example does not have a doublet configuration since there is no second lens element in a first lens group 110CMP2.

Third Example

Each value in the third example is shown in Tables 8, 9, 10, and 11. Each value in the third example corresponds to the imaging lens 100B shown in FIG. 8.

The first example is a design example for a 3-megapixel CMOS imager having a ⅕ size and a 1.4 μm pitch.

As described above, the imaging lens 100B is configured to include the first lens group 110B, the second lens group 120B, and the third lens group 130, and the first lens group 110B is formed as follows.

The first lens group 110B is formed by dividing the inside of the first lens element 111CMP in the first comparative example into two parts.

That is, the first and second lens elements 111 and 112 are bonded to each other from the object side to form a lens.

Accordingly, at room temperature, this lens performs the same operation as the first lens element 111CMP in the second comparative example using two lenses.

The first and second lens elements 111 and 112 have the same Abbe number 57.3 and the same d-line refractive index 1.51.

In addition, the first lens element 111 is formed of a material whose temperature refractive index change (dn/dt) is $-0.87 \times 10^{-4}$ [1/deg], and the second lens element 112 is formed of a material whose temperature refractive index change (dn/dt) is $-1.8 \times 10^{-4}$ [1/deg].

Figure 11:
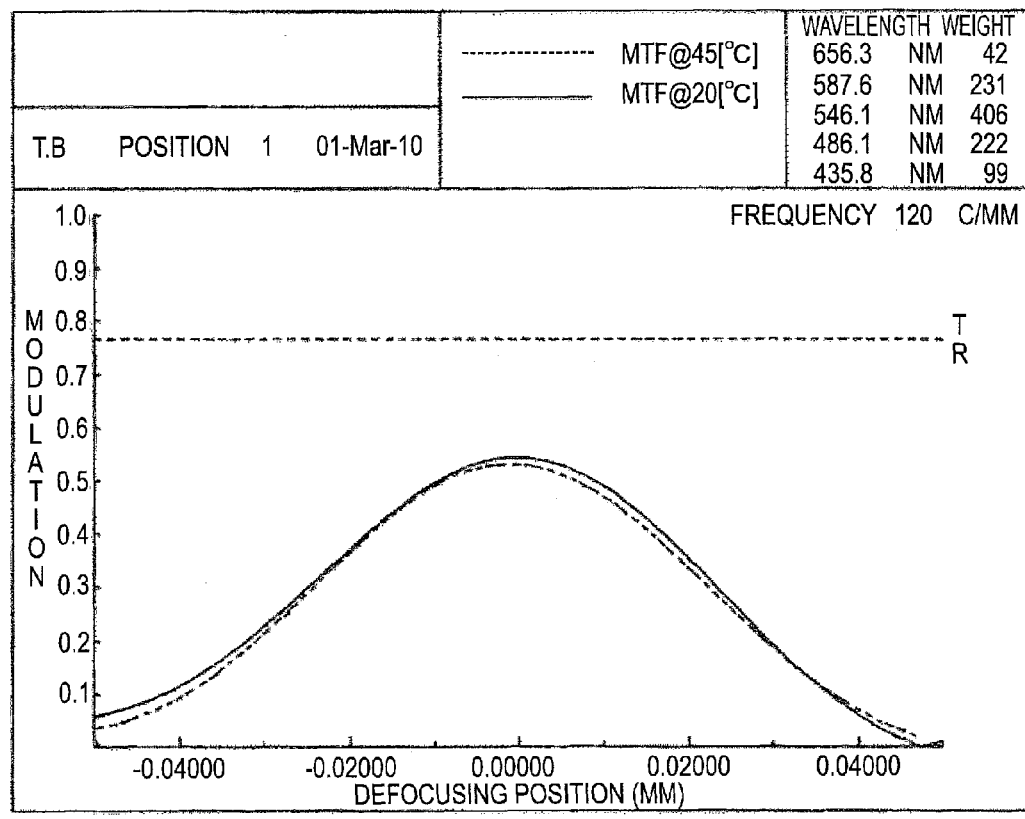
FIG. 11 is a view showing the defocusing characteristic of MTF of an imaging lens in a third example.

By adopting such a configuration, as shown in FIG. 11, a focus change at temperature of 25° C. can be reduced to approximately 0.

Table 8 shows a radius of curvature (R: mm), a distance (d: mm), a refractive index (nd), and a dispersion value (vd) of each lens element and each glass substrate (transparent body) corresponding to the surface number of the imaging lens in the third example.

TABLE 8

Lens configuration data in the third example

| Surface number | | R | d | nd | vd |
|---|---|---|---|---|---|
| 1 | SL11: | 0.926 | 0.430 | 1.51 | 57.3 |
| 2 | SL12: | −1.500 | 0.040 | 1.51 | 57.3 |
| 3 | SG11: | INFINITY | 0.400 | 1.52 | 55.0 |
| 4 | SG1R: | INFINITY | 0.050 | 1.51 | 57.3 |
| 5 | SL1R: | 2.394 | 0.248 | | |
| 6 | SL21: | −4.029 | 0.050 | 1.60 | 30.0 |
| 7 | SG21: | INFINITY | 0.400 | 1.52 | 55.0 |

TABLE 8-continued

Lens configuration data in the third example

| Surface number | | R | d | nd | vd |
|---|---|---|---|---|---|
| 8 | SG2R: | INFINITY | 0.418 | 1.60 | 30.0 |
| 9 | SL2R: | −1.409 | 0.260 | | |
| 10 | SL31: | −1.024 | 0.050 | 1.60 | 30.0 |
| 11 | SG31: | INFINITY | 0.400 | 1.52 | 55.0 |
| 12 | SG3R: | INFINITY | 0.538 | 1.51 | 57.3 |
| 13 | SL3R: | −1098.917 | 0.015 | | |

Table 9 shows fourth-order, six-order, eighth-order, and tenth-order aspheric coefficients of the surface 1 of the first lens element 111, the surface 4 of the second lens element 114, the surface 5 of the fourth lens element 121B, and surface 8 of the fifth lens element 123B including the aspheric surfaces in the third example. In addition, Table 9 shows fourth-order, six-order, eighth-order, and tenth-order aspheric coefficients of the surface 9 of the sixth lens element 131 and the surface 12 of the seventh lens element 133.

In Table 2, K indicates a cone constant, and A, B, C, and D indicate a fourth-order aspheric coefficient, a six-order aspheric coefficient, an eighth-order aspheric coefficient, and a tenth-order aspheric coefficient, respectively.

TABLE 9

Aspheric surface data in the third example

| | | | | |
|---|---|---|---|---|
| SL11 surface | K: −0.638 | A: 0.999E−01 | B: −0.621E−01 | C: 0.138E+00 | D: 0.450E−01 |
| SL1R surface | K: −0.444 | A: 0.145E+00 | B: 0.446E+00 | C: −0.136E+01 | D: 0.584E+01 |
| SL21 surface | K: 0.917 | A: −0.326E+00 | B: 0.271E+00 | C: −0.173E+01 | D: 0.384E+00 |
| SL2R surface | K: 0.627 | A: −0.100E+00 | B: 0.222E+00 | C: 0.468E−01 | D: −0.417E−01 |
| SL31 surface | K: −0.799 | A: −0.227E+00 | B: 0.484E+00 | C: −0.168E+00 | D: −0.643E−02 |
| SL3R surface | K: −1.000 | A: 0.184E−01 | B: −0.888E−01 | C: 0.343E−01 | D: −0.467E−02 |

Table 10 specifically shows the focal length f, numerical aperture F, half angle of view ω, and lens length H of the imaging lens 100B in the third example. Here, the focal length f is set to 2.94 [mm], the numerical aperture F is set to 2.8, the half angle of view ω is set to 31.4 deg, and the lens length H is set to 3.4 [mm].

TABLE 10

Configuration data in the third example f (focal length) = 2.94 mm
F (numerical aperture) = 2.8
ω (half angle of view) = 31.4 deg
H (lens length) = 3.4 mm Table 11 shows that the above-described conditional expressions (1) to (7) are satisfied in the third example.

TABLE 11

Numerical values of conditions expression in each example
Conditional expression/third example

| (1) | $-0.87 \times 10^{-4}$ |
|---|---|
| (2) | $-1.8 \times 10^{-4}$ |
| (3) | 0.926 |
| (4) | −1.5 |
| (5) | 0 |
| (6) | — |
| (7) | — |

As shown in Table 11, in the third example, the constant dnL1/dt of the temperature refractive index change of the glass material of the first lens element 111 is set to −0.87× $10^{-4}$. Accordingly, the conditions defined in the conditional expression (1) are satisfied.

The constant dnL2/dt of the temperature refractive index change of the glass material of the second lens element 112 is set to −1.8×$10^{-4}$. Accordingly, the conditions defined in the conditional expression (2) are satisfied.

The radius of curvature RS1 of the first surface of incidence is set to 0.926. Accordingly, the conditions defined in the conditional expression (3) are satisfied.

The radius of curvature RS2 of the second surface of incidence is set to −1.5. Accordingly, the conditions defined in the conditional expression (4) are satisfied.

An absolute value difference between the d-line refractive index nL1 of the first lens element 111 and the d-line refractive index nL2 of the second lens element 112 is set to 0. Accordingly, the conditions defined in the conditional expression (5) are satisfied.

In addition, in the first example, the conditional expressions (6) and (7) are not particularly defined.

Figure 12:
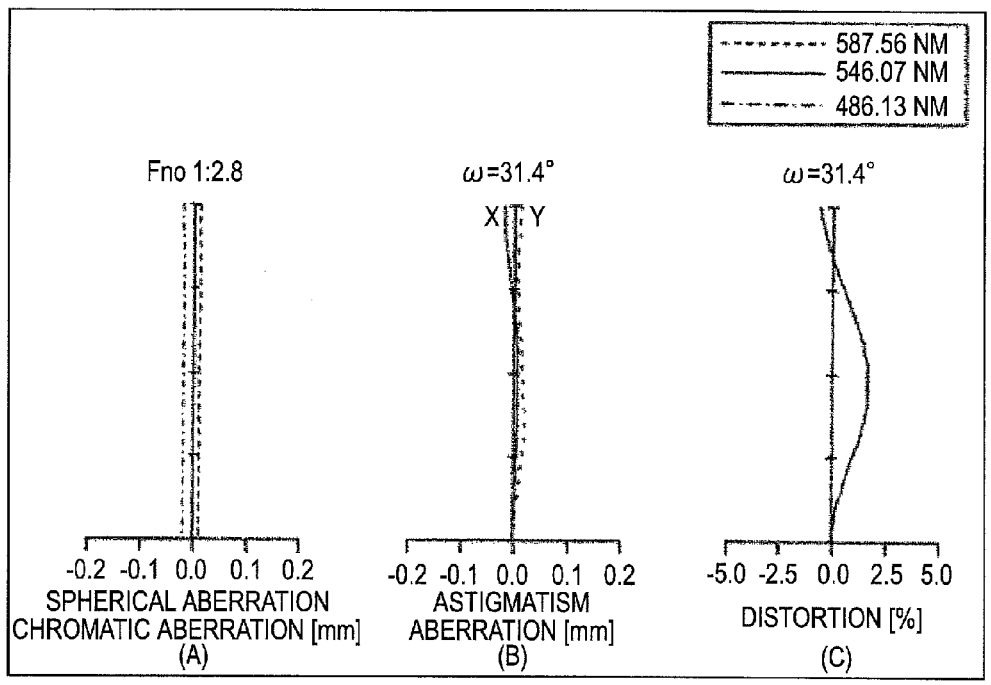
FIG. 12 is an aberration diagram showing a spherical aberration, an astigmatism, and distortion in the third example.

FIG. 12 is an aberration diagram showing a spherical aberration (chromatic aberration), an astigmatism, and distortion in the third example. (A) in FIG. 12 shows the spherical aberration (chromatic aberration), (B) in FIG. 12 shows the astigmatism, and (C) in FIG. 12 shows the distortion.

As can be seen from FIG. 12, according to the third example, all aberrations including the spherical surface, astigmatism, and distortion are satisfactorily corrected. As a result, an imaging lens including an optical unit excellent in image forming performance is obtained.

In addition, according to the third example, as shown in FIG. 10, a focus change at temperature of 25° C. can be reduced to approximately 0.

Second Comparative Example

Here, a comparative example shown in FIG. 10 will be described.

The second comparative example is a design example for a 3-megapixel CMOS imager having a ⅕ size and a 1.4 μm pitch.

The imaging lens 100CMP2 of the first comparative example does not have a doublet configuration since there is no second lens element in the first lens group 110CMP2.

Table 5 shows a radius of curvature (R: mm), a distance (d: mm), a refractive index (nd), and a dispersion value (vd) of each lens element and each glass substrate (transparent body) corresponding to the surface number of the imaging lens in the first comparative example.

TABLE 12

Lens configuration data in the second comparative example

| Surface number | | R | d | nd | vd |
|---|---|---|---|---|---|
| 1 | SL11: | 0.926 | 0.470 | 1.51 | 57.3 |
| 2 | SG11: | INFINITY | 0.400 | 1.52 | 55.0 |
| 3 | SG1R: | INFINITY | 0.050 | 1.51 | 57.3 |
| 4 | SL1R: | 2.394 | 0.248 | | |
| 5 | SL21: | −4.029 | 0.050 | 1.60 | 30.0 |
| 6 | SG21: | INFINITY | 0.400 | 1.52 | 55.0 |
| 7 | SG2R: | INFINITY | 0.418 | 1.60 | 30.0 |
| 8 | SL2R: | −1.409 | 0.260 | | |
| 9 | SL31: | −1.024 | 0.050 | 1.60 | 30.0 |
| 10 | SG31: | INFINITY | 0.400 | 1.52 | 55.0 |
| 11 | SG3R: | INFINITY | 0.538 | 1.51 | 57.3 |
| 12 | SL3R: | −1098.917 | 0.015 | | |

In the second comparative example, lens configuration data shown in Table 12 is illustrated. The aspheric surface data is similar to Table 9, and the configuration data is similar to Table 10.

As described above, the imaging lens 100CMP2 in the second comparative example is configured to include the first lens group 110B, the second lens group 120B, and the third lens group 130, and the first lens group 110B is formed as follows. The first lens element 111 having a plano-convex shape and the Abbe number 57.3 is bonded to the object side surface of the glass substrate equivalent to BK7, and the third lens element 114 having a plano-concave shape and the Abbe number 57.3 is bonded to the opposite side of the glass substrate.

Here, a diaphragm is realized by attaching a material that hardly allows light to be transmitted therethrough, such as a chromium film, on the object side surface of the glass substrate in advance.

In addition, an IR cut filter is also added.

Due to these components, the astigmatism and the comatic aberration are satisfactorily corrected in the first lens group, and a structure where aberrations of the entire lens unit are easily corrected can be obtained. The first lens group 110B has strong positive power as a whole, and this greatly contributes to a reduction in the optical length.

The second and third lens groups 120 and 130 are the same as those shown in FIG. 8.

Here, characteristics at room temperature are excellent. However, the temperature refractive index change (dn/dt) of the first, second, and sixth lens elements is −0.87×$10^{-4}$ [1/deg], and the temperature refractive index change (dn/dt) of the third, fourth, and fifth lens elements is −1.50×$10^{-4}$ [1/deg].

Figure 13:
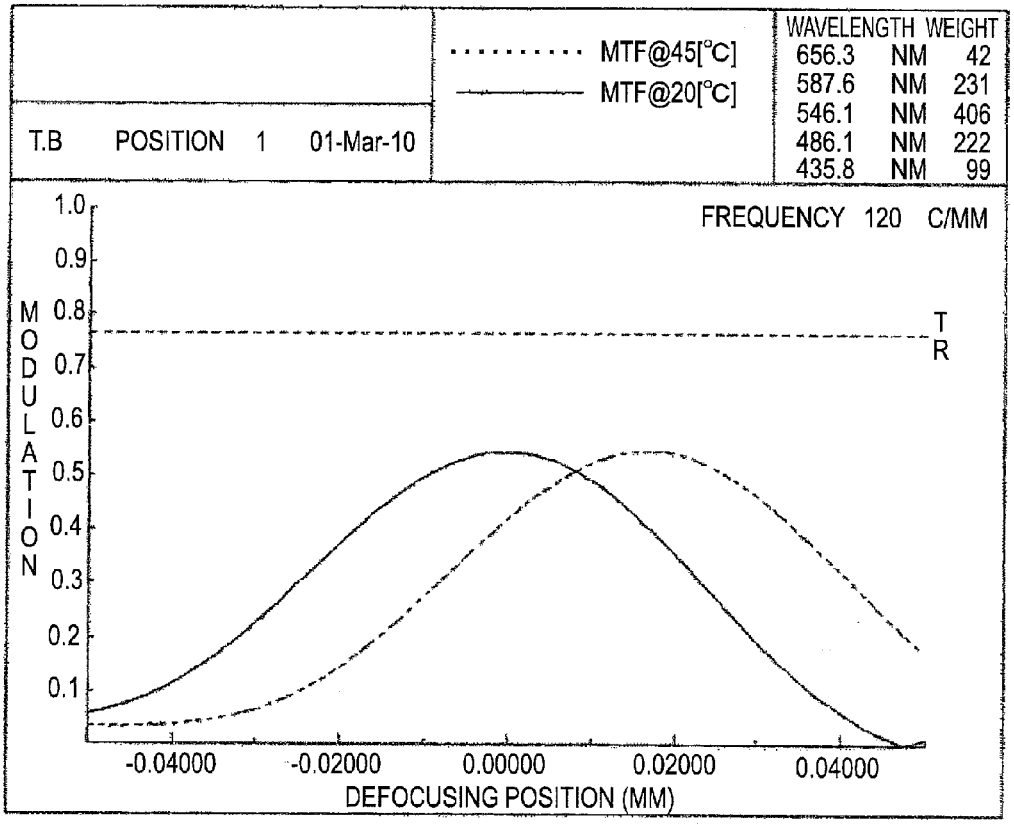
FIG. 13 is a view showing the defocusing characteristic of MTF of the imaging lens in a second comparative example.

For these reasons, as shown in FIG. 13, temperature defocusing of the entire device causes a focus change of 20 [μm] with a change of 25° C. This is a problem in the practical specification.

4. Fourth Embodiment

Figure 14:
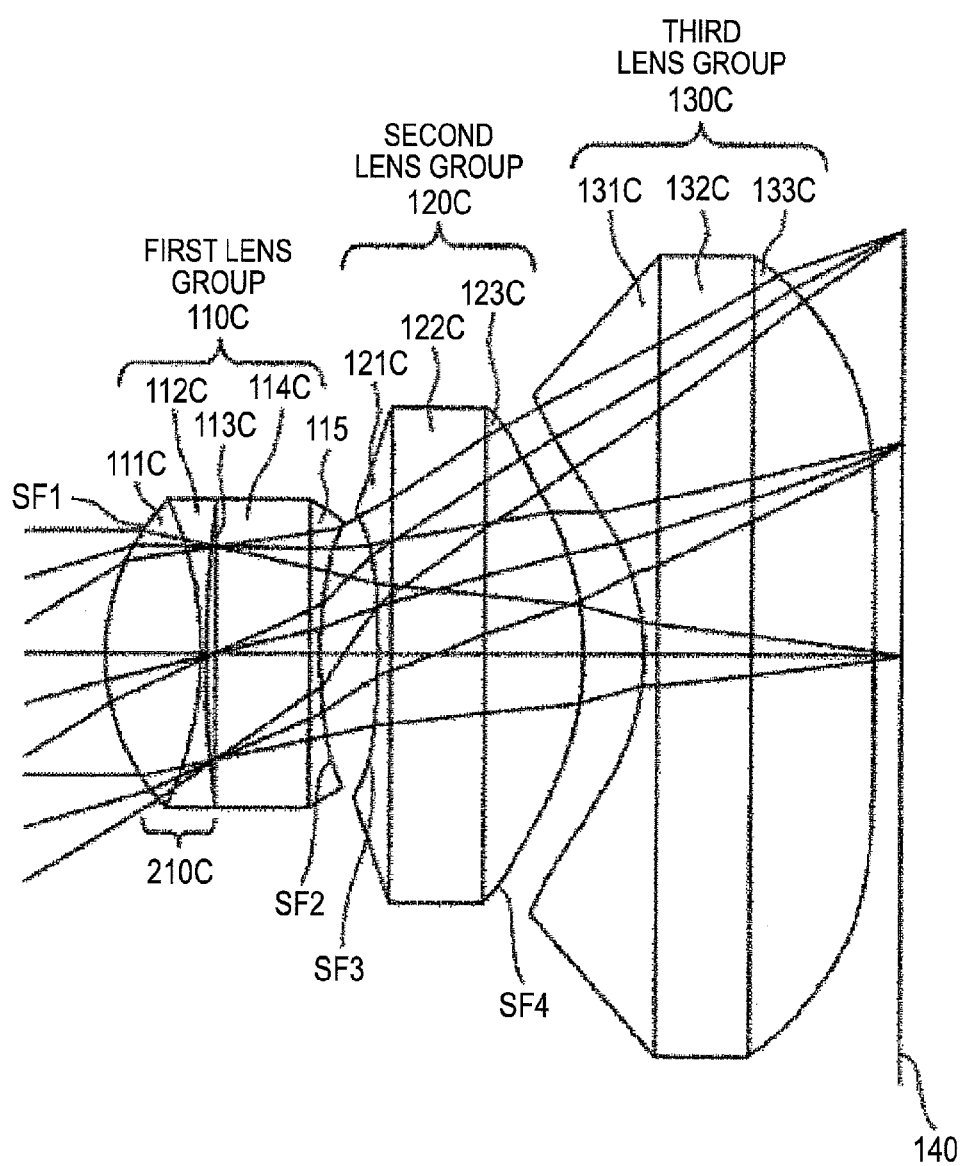
FIG. 14 is a view showing a configuration example of an imaging lens according to a fourth embodiment of the present invention.

FIG. 14 is a view showing a configuration example of an imaging lens according to a fourth embodiment of the present invention.

An imaging lens 100C according to the fourth embodiment shown in FIG. 14 is different from the imaging lens 100B according to the third embodiment shown in FIG. 8 in the following point.

A first lens group 110A of the imaging lens 100B includes a first lens element 111C, a second lens element 112C, a third lens element 113C, a first transparent body 1140, and a fourth lens element 115.

The first lens group 110C shown in FIG. 14 is formed by a triplet 210C, which is a bonding body of three lens elements located on the object side of the first transparent body 114C, instead of the doublet 200 using the two first and second lens elements 111 and 112.

In addition, surface number SL13 is given to the surface of the third lens element 113C bonded to the image surface side surface of the second lens element 112C.

The triplet 210C is formed by the bonding body of the first lens element 111C, the second lens element 112C, and the third lens element 113C.

Only the reference numerals or names are different, and the first transparent body 114C corresponds to the first transparent body 113 in FIG. 8 and the fourth lens element 115 corresponds to the third lens element 114 in FIG. 8.

The second lens group 120C includes a fifth lens element 121C, a second transparent body 122C, and a sixth lens element 123C.

Basically, the second lens group 120C shown in FIG. 14 has the same configuration and function as the second lens group 120B shown in FIG. 8.

The fifth lens element 121C in FIG. 14 corresponds to the fourth lens element 121B in FIG. 8, the second transparent body 122C in FIG. 14 corresponds to the second transparent body 122 in FIG. 8, and the sixth lens element 123C in FIG. 14 corresponds to the fifth lens element 123 in FIG. 8.

The third lens group 130C includes a seventh lens element 131C, a third transparent body 132C, and an eighth lens element 133C.

Basically, the third lens group 130C shown in FIG. 14 has the same configuration and function as the third lens group 130B shown in FIG. 8.

The seventh lens element 131C in FIG. 14 corresponds to the sixth lens element 131B in FIG. 8, the third transparent body 132C in FIG. 14 corresponds to the third transparent body 132 in FIG. 8, and the eighth lens element 133C in FIG. 13 corresponds to the seventh lens element 133 in FIG. 8.

Hereinafter, specific values of the imaging lens 100C will be shown by way of a fourth example. In addition, in the fourth example, the surface numbers shown in FIG. 9 are given. In addition, surface number SL13 is given to the surface of the third lens element 113C bonded to the image surface side surface of the second lens element 112C.

Fourth Example

As described above, in the fourth example, the inside of the first lens element 111CMP2 in the second comparative example is divided into three material parts.

The first to third lens elements 111C to 113C are bonded to each other from the object side to form a lens. Accordingly, at room temperature, this lens performs the same operation as the first lens element 111CMP2 in the second comparative example using three lenses.

Here, the first to third lens elements 111C to 113C also have the same d-line refractive index and the same d-line Abbe number.

The first lens element 111C is formed of a material whose temperature refractive index change (dn/dt) is $-0.87 \times 10^{-4}$ [1/deg], the second lens element 112C is formed of a material whose temperature refractive index change (dn/dt) is $-1.8 \times 10^{-4}$ [1/deg], and the third lens element 113C is formed of a material whose temperature refractive index change (dn/dt) is $-0.87 \times 10^{-4}$ [1/deg].

By adopting such a configuration, defocusing can be reduced to approximately 0 in the fourth example although defocusing of 20 [μm] occurs with a change of 25° C. in the second comparative example.

Table 13 shows a radius of curvature (R: mm), a distance (d: mm), a refractive index (nd), and a dispersion value (vd) of each lens element and each glass substrate (transparent body) corresponding to the surface number of the imaging lens in the fourth example.

TABLE 13

Lens configuration data in the fourth example

| Surface number | | R | d | nd | vd |
|---|---|---|---|---|---|
| 1 | SL11: | 0.926 | 0.410 | 1.51 | 57.3 |
| 2 | SL12: | −1.500 | 0.020 | 1.51 | 57.3 |

TABLE 13-continued

Lens configuration data in the fourth example

| Surface number | | R | d | nd | vd |
|---|---|---|---|---|---|
| 3 | SL13: | −1.500 | 0.040 | 1.51 | 57.3 |
| 4 | SG11: | INFINITY | 0.400 | 1.52 | 55.0 |
| 5 | SG1R: | INFINITY | 0.050 | 1.51 | 57.3 |
| 6 | SL1R: | 2.394 | 0.248 | | |
| 7 | SL21: | −4.029 | 0.050 | 1.60 | 30.0 |
| 8 | SG21: | INFINITY | 0.400 | 1.52 | 55.0 |
| 9 | SG2R: | INFINITY | 0.418 | 1.60 | 30.0 |
| 10 | SL2R: | −1.409 | 0.260 | | |
| 11 | SL31: | −1.024 | 0.050 | 1.60 | 30.0 |
| 12 | SG31: | INFINITY | 0.400 | 1.52 | 55.0 |
| 13 | SG3R: | INFINITY | 0.538 | 1.51 | 57.3 |
| 14 | SL3R: | −1098.917 | 0.015 | | |

In the fourth example, lens configuration data shown in Table 13 is illustrated.

The aspheric surface data is similar to Table 9, and the configuration data is similar to Table 10. In addition, longitudinal aberration characteristics are the same as those in FIG. 10.

Table 14 shows that the above-described conditional expressions (1) to (7) are satisfied in the fourth example.

TABLE 14

Numerical values of conditions expression in each example
Conditional expression/fourth example

| (1) | $-0.87 \times 10^{-4}$ |
|---|---|
| (2) | $-1.8 \times 10^{-4}$ |
| (3) | 0.926 |
| (4) | −1.5 |
| (5) | 0 |
| (6) | $-0.87 \times 10^{-4}$ |
| (7) | 1.5 |

As shown in Table 14, in the fourth example, the constant dnL1/dt of the temperature refractive index change of the glass material of the first lens element 111C is set to $-0.87 \times 10^{-4}$. Accordingly, the conditions defined in the conditional expression (1) are satisfied.

The constant dnL2/dt of the temperature refractive index change of the glass material of the second lens element 112C is set to $-1.8 \times 10^{-4}$. Accordingly, the conditions defined in the conditional expression (2) are satisfied.

The radius of curvature RS1 of the first surface of incidence is set to 0.926. Accordingly, the conditions defined in the conditional expression (3) are satisfied.

The radius of curvature RS2 of the second surface of incidence is set to −1.5. Accordingly, the conditions defined in the conditional expression (4) are satisfied.

An absolute value difference between the d-line refractive index nL1 of the first lens element 111C and the d-line refractive index nL2 of the second lens element 112C is set to 0. Accordingly, the conditions defined in the conditional expression (5) are satisfied.

The constant dnL3/dt of the temperature refractive index change of the glass material of the third lens element 113C is set to $-0.87 \times 10^{-4}$. Accordingly, the conditions defined in the conditional expression (6) are satisfied.

The radius of curvature RS3 of the third surface of incidence is set to 1.5. Accordingly, the conditions defined in the conditional expression (7) are satisfied.

5. Fifth Embodiment

Figure 15:
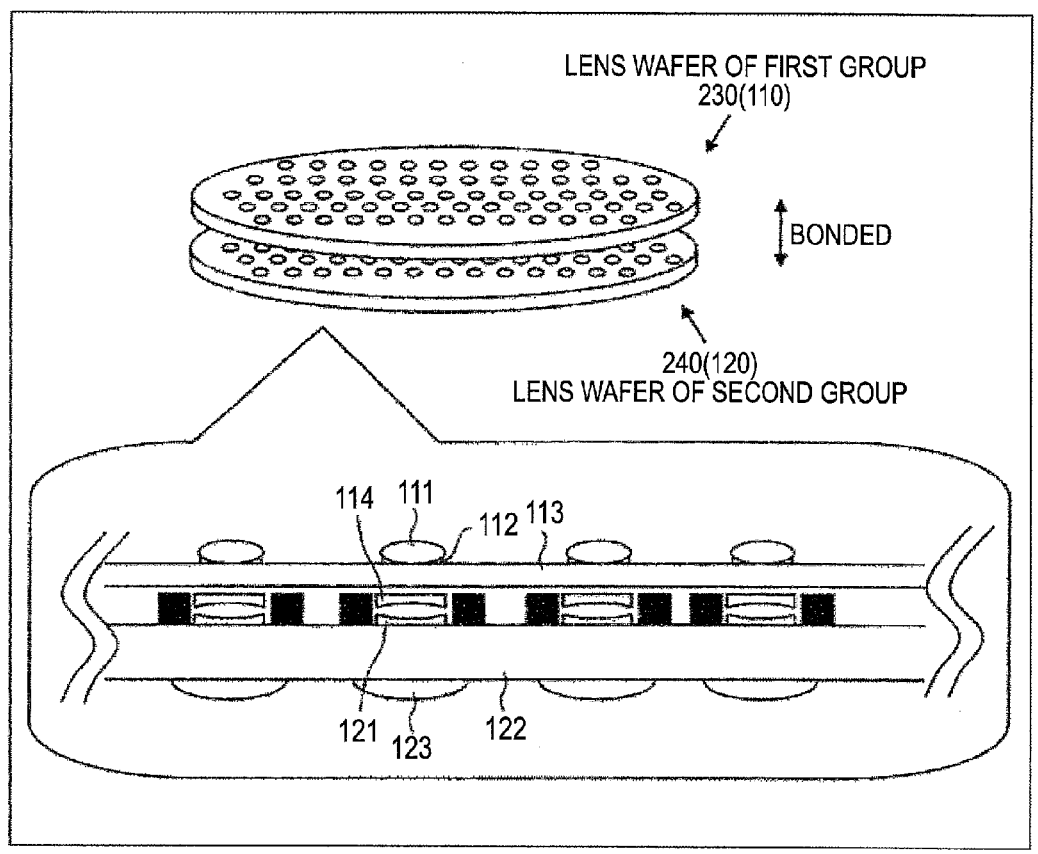
FIG. 15 is a conceptual view showing the wafer level optics according to a fifth embodiment of the present invention.

FIG. 15 is a conceptual view showing the wafer level optics according to a fourth embodiment of the present invention.

A large number of replica lenses are formed on top and bottom surfaces of a glass substrate 220, and are set as a first group 230 (110) and a second group 240 (120).

Then, these two glass wafers are bonded to each other to manufacture a large number of lenses at the same time. Here, in order to bond the two glass wafers to each other, a spacer may be interposed therebetween, or a protector or a spacer may be attached to the top or bottom surface.

According to the present embodiment, the following effects can be acquired.

In the imaging lens according to the present embodiment, a lens with positive power and a lens with negative power are used in a state where the lenses overlap each other, and the temperature refractive index change coefficient (absolute value) of the lens with negative power is larger than that of the lens with positive power. Accordingly, it is possible to reduce the temperature defocusing of the entire device.

By applying this method to the first lens element on the object side of the hybrid lens, it is possible to eliminate the temperature defocusing of the entire device.

The hybrid method is advantageous in that an IR cut filter or a diaphragm can be formed on a glass wafer and accordingly these separate components are not necessary unlike the related art, and a large number of finished products can be manufactured at the same time and accordingly the number of assembly steps per product is reduced and products can be manufactured inexpensively.

In the former case, since no separate IR cut filter is necessary, there is also an advantage in that the back focus of the lens can be short. Therefore, a more flexible optical design is possible.

These advantages become more noticeable by eliminating temperature defocusing.

Since the temperature defocusing, which has been a problem in the FF module, does not occur, it is possible to realize the FF of the AF.

There is an advantage in that bar code reading can be guaranteed.

In addition, since the doublet structure or the triplet structure is adopted, design flexibility is further increased even in the same group configuration.

Without being limited to the hybrid structure, the present invention may also be applied to a lens element in which the hybrid structure and other structures are mixed.

Manufacturing lens in the form of a wafer is called a wafer opt. Using this, it is possible to manufacture lenses that can satisfy the specifications of most camera modules for mobile phones. Accordingly, it is possible to increase the importance of these techniques. Accordingly, it is possible to manufacture a large number of camera modules inexpensively.

As a result, a lens element that is small and bright and is excellent in the imaging characteristics and that has a large depth of field can be manufactured inexpensively. In particular, the present invention is ideal for the fixed focus optical system, and a large depth of field is obtained without an actuator. Accordingly, the present invention is ideal for products for which high reliability is requested, such as a mobile phone or an in-vehicle, and may be used in various fields.

The imaging lenses 100, 100A, 100B, and 100C having the above-described characteristics may be applied as camera lenses mounted in a digital camera using an imaging element, such as a CCD or a CMOS sensor, especially in a small electronic apparatus, such as a mobile phone.

6. Sixth Embodiment

Figure 16:
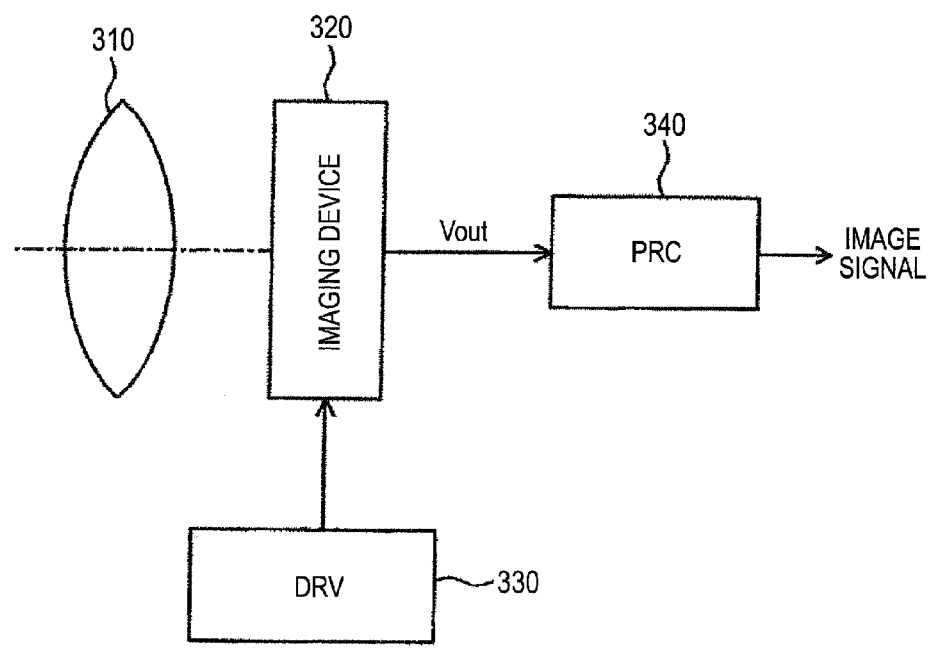
FIG. 16 is a block diagram showing a configuration example of an imaging apparatus that adopts the imaging lens according to the present embodiment.

FIG. 16 is a block diagram showing a configuration example of an imaging apparatus that adopts an imaging lens including the optical unit according to the present embodiment.

As shown in FIG. 16, an imaging apparatus 300 includes an optical system 310, to which the imaging lenses 100, 100A, 100B, 100C, and 100D according to the present embodiment are applied, and an imaging device 320 for which a CCD or a CMOS image sensor (solid state imaging device) can be applied.

The optical system 310 forms a subject image by guiding incidence light to the imaging surface including the pixel region of the imaging device 320.

The imaging apparatus 300 further includes a driving circuit (DRV) 330 that drives the imaging device 320 and a signal processing circuit (PRC) 340 that processes the output signal of the imaging device 320.

The driving circuit 330 includes a timing generator (not shown) that generates various kinds of timing signals involving a start pulse or a clock pulse for driving circuits in the imaging device 320, and drives the imaging device 320 with a predetermined timing signal.

In addition, the signal processing circuit 340 performs predetermined signal processing on the output signal of the imaging device 320.

The image signal processed by the signal processing circuit 340 is recorded on a recording medium, such as a memory. Hard copy of the image information recorded on the recording medium is executed by a printer or the like. In addition, the image signal processed by the signal processing circuit 340 is projected as a moving image on a monitor formed by a liquid crystal display or the like.

As described above, a high-precision camera which consumes low electric power can be realized by providing the above-described imaging lenses 100, 100A, 100B, and 100C as the optical system 310 in an imaging apparatus, such as a digital still camera.

REFERENCE SIGNS LIST

100, 100A to 100D: Imaging Lens
110, 110A to 110D: First Lens Group
120, 120A to 120C: Second Lens Group
130: Third Lens Group
300: Imaging Apparatus
310: Optical System
320: Imaging Device
330: Driving Circuit (DRV)
340: Signal Processing Circuit (Protection Circuit)

The invention claimed is:

1. An optical unit comprising:
at least first and second lens groups of the first and second lens groups and a third lens group disposed in order from an object side toward an image surface side,
wherein the first lens group includes a bonding body of at least two first and second lens elements, a transparent body, and a third lens element that are disposed in order from the object side toward the image surface side, and
in the bonding body, the first and second lens elements are formed of resin materials having different temperature refractive index changes.

2. The optical unit according to claim 1,
wherein the first lens element on the object side is formed using a lens with positive power that has a small temperature refractive index change, and the second lens element is formed using a lens with negative power that has a large temperature refractive index change.

3. The optical unit according to claim 1,
wherein a constant dnL1/dt of a temperature refractive index change of a glass material of the first lens element and a constant dnL2/dt of a temperature refractive index change of a glass material of the second lens element satisfy conditional expressions of $-1.5\times10^{-4} \leq dnL1/dt \leq -0.1\times10^{-4}$ (1) and $-4.0\times10^{-4} \leq dnL2/dt \leq -0.4\times10^{-4}$ (2).

4. The optical unit according to claim 1, wherein a radius of curvature RS1 of a first surface of incidence, which is an object side surface of the first lens element, and a radius of curvature RS2 of a second surface of incidence, which is an object side surface of the second lens element, satisfy conditional expressions of $0.1 \leq RS1 \leq 100$ (3) and $-100 \leq RS2 \leq -0.1$ (4).

5. The optical unit according to claim 1, wherein an absolute value difference between a refractive index nL1 of the first lens element and a refractive index nL2 of the second lens element satisfies a conditional expression of $0.0 \leq |nL1-nL2| \leq 0.1$ (5).

6. The optical unit according to claim 1, wherein the bonding body includes first to third lens elements that are disposed in order from the object side toward the image surface side so as to overlap each other and that are formed of resin materials having different temperature refractive index changes.

7. The optical unit according to claim 6, wherein the first lens element is formed using a lens with positive power that has a small temperature refractive index change, the second lens element is formed using a lens with negative power that has a large temperature refractive index change, and the third lens element is formed using a lens with positive power that has a small temperature refractive index change.

8. The optical unit according to claim 6, wherein the first and third lens elements are formed of the same glass material.

9. The optical unit according to claim 6, wherein a constant dnL3/dt of a temperature refractive index change of a glass material of the third lens element satisfies a conditional expression of $1.5\times10^{-4} \leq dnL3/dt \leq -0.1\times10^{-4}$ (6).

10. The optical unit according to claim 6, wherein a radius of curvature RS3 of a third surface of incidence, which is an object side surface of the third lens element, satisfies a conditional expression of $0.1 \leq RS \leq 100$ (7).

11. An optical unit comprising:
at least one lens element with positive power and at least one lens element with negative power that are disposed in order from an object side toward an image surface side, are formed of at least two or more resin materials having different temperature refractive index changes, and overlap each other on a curved surface,
wherein the temperature refractive index change ($|dn/dt|$) of the lens element with positive power is smaller than the temperature refractive index change ($|dn/dt|$) of the lens element with negative power by at least $0.1\times10^{-4}$ [1/deg].

12. The optical unit according to claim 11, wherein the first lens element on the object side is formed using a lens with positive power that has a small temperature refractive index change, and the second lens element is formed using a lens with negative power that has a large temperature refractive index change.

13. The optical unit according to claim 11, wherein a constant dnL1/dt of a temperature refractive index change of a glass material of the first lens element and a constant dnL2/dt of a temperature refractive index change of a glass material of the second lens element satisfy conditional expressions of $-1.5\times10^{-4} \leq dnL1/dt \leq -0.1\times10^{-4}$ (1) and $-4.0\times10^{-4} \leq dnL2/dt \leq -0.4\times10^{-4}$ (2).

14. The optical unit according to claim 11, wherein a radius of curvature RS1 of a first surface of incidence, which is an object side surface of the first lens element, and a radius of curvature RS2 of a second surface of incidence, which is an object side surface of the second lens element, satisfy conditional expressions of $0.1 \leq RS1 \leq 100$ (3) and $-100 \leq RS2 \leq -0.1$ (4).

15. The optical unit according to claim 11, wherein an absolute value difference between a refractive index nL1 of the first lens element and a refractive index nL2 of the second lens element satisfies a conditional expression of $0.0 \leq |nL1-nL2| \leq 0.1$ (5).

16. An imaging apparatus comprising:
an imaging device; and
an optical unit that forms a subject image on the imaging device,
wherein the optical unit includes at least first and second lens groups of the first and second lens groups and a third lens group disposed in order from an object side toward an image surface side,
the first lens group includes a bonding body of at least two first and second lens elements, a transparent body, and a third lens element that are disposed in order from the object side toward the image surface side, and
in the bonding body, the first and second lens elements are formed of resin materials having different temperature refractive index changes.

17. An imaging apparatus comprising:
an imaging device; and
an optical unit that forms a subject image on the imaging device,
wherein the optical unit includes at least one lens element with positive power and at least one lens element with negative power that are disposed in order from an object side toward an image surface side, are formed of at least two or more resin materials having different temperature refractive index changes, and overlap each other on a curved surface, and
the temperature refractive index change ($|dn/dt|$) of the lens element with positive power is smaller than the temperature refractive index change ($|dn/dt|$) of the lens element with negative power by at least $0.1\times10^{-4}$ [1/deg].

* * * * *